United States Patent [19]

Neuer et al.

[11] Patent Number: 5,503,598
[45] Date of Patent: Apr. 2, 1996

[54] DERAILLEUR ARRANGEMENT, IN PARTICULAR FOR BICYCLES

[75] Inventors: Andreas Neuer, Schweinfurt; Jörg Bodmer, Niederwerrn, both of Germany

[73] Assignee: Fichtel & Sachs AG, Schweinfurt, Germany

[21] Appl. No.: 304,136

[22] Filed: Sep. 12, 1994

[30] Foreign Application Priority Data

Sep. 13, 1993 [DE] Germany .............. 43 30 989.5

[51] Int. Cl.⁶ ...................................... F16H 7/00
[52] U.S. Cl. ............................................ 474/78; 474/160
[58] Field of Search ............................. 474/152–157, 474/78–81, 160

[56] References Cited

U.S. PATENT DOCUMENTS

| | | |
|---|---|---|
| 3,709,053 | 1/1973 | Ohshita . |
| 3,956,943 | 5/1976 | Yamasaki . |
| 4,181,033 | 1/1980 | Nagano . |
| 4,268,259 | 5/1981 | Segawa et al. . |
| 4,330,286 | 5/1982 | Nagano . |
| 4,348,200 | 9/1982 | Terada . |
| 4,519,791 | 5/1985 | Nagano . |
| 4,576,587 | 3/1986 | Nagano . |
| 4,773,893 | 9/1988 | Su et al. . |
| 4,889,521 | 12/1989 | Nagano . |
| 4,988,328 | 1/1991 | Iwasaki et al. . |
| 5,073,151 | 12/1991 | Nagano . |
| 5,085,620 | 2/1992 | Nagano . |
| 5,123,878 | 6/1992 | Nagano . |
| 5,192,248 | 3/1993 | Nagano ..................... 474/160 X |
| 5,192,249 | 3/1993 | Nagano ..................... 474/160 |

FOREIGN PATENT DOCUMENTS

| | | |
|---|---|---|
| 0002903 | 7/1979 | European Pat. Off. . |
| 0313345 | 4/1989 | European Pat. Off. . |
| 0417696 | 3/1991 | European Pat. Off. . |
| 0429007 | 5/1991 | European Pat. Off. . |
| 0444645 | 9/1991 | European Pat. Off. . |
| 0474139 | 3/1992 | European Pat. Off. . |
| 2469624 | 5/1981 | France . |
| 2758416 | 6/1978 | Germany . |
| 2837270 | 3/1979 | Germany . |
| 2836258 | 3/1979 | Germany . |
| 2836066 | 3/1979 | Germany . |
| 3037857 | 4/1981 | Germany . |
| 2945271 | 5/1981 | Germany . |
| 0475021 | 11/1937 | United Kingdom . |
| 2005363 | 4/1979 | United Kingdom . |

Primary Examiner—Michael Powell Buiz
Attorney, Agent, or Firm—Nils H. Ljungman & Associates

[57] ABSTRACT

A derailleur with at least two sprockets (A, C) on a sprocket unit (A–C) is designed so that the chain (B) can be shifted up and down more easily between a smaller sprocket (C) and a larger sprocket (A). For this purpose, there is a double tooth space (ZA) on at least the larger sprocket (A), which forms a channel for the transfer of the chain between the two sprockets. By means of a link support plate (16) of the larger sprocket (A), a path (B1, B2. B3, B4, B5) which is curved or bent radially outwardly convexly—seen in the axial direction—of a chain transfer segment is achieved, which is formed during the transfer of the chain from the smaller sprocket (C) to the larger sprocket (A) in the vicinity of the double tooth space (ZA).

18 Claims, 12 Drawing Sheets

DERAILLEUR ARRANGEMENT, IN PARTICULAR FOR BICYCLES

BACKGROUND OF THE INVENTION

1. Field of the Invention

This invention relates to a derailleur arrangement, in particular for bicycles, comprising a driving sprocket unit and a driven sprocket unit, a well as a chain connecting these two sprocket units to one another, whereby at least one of the sprocket units is designed as a multisprocket unit with at least two sprockets, namely a larger sprocket and a smaller sprocket. In addition, the two sprockets of the multisprocket unit each typically have a number of teeth and a corresponding number of spaces formed between each pair of teeth. In addition, the chain is typically formed by successive chain links and by inner and outer link plate pairs in alternating sequence between the chain links. In addition, to shift the chain between the two sprockets of the multisprocket unit, there is typically a shifter in an approach area in which, in the normal direction of circulation of the chain and of the sprockets, the chain approaches the multisprocket unit, and this shifter is designed to impart motions to the chain in a direction parallel to the axis of the multisprocket unit.

In addition, when the chain is shifted between the sprockets of the multisprocket unit, a chain transfer segment is typically formed between the sprocket from which the chain is being transferred and the sprocket to which the chain is being transferred, which chain transfer segment traverses the circulation area of the multisprocket unit from the chain approach area to a chain runout area of the multisprocket unit. In addition, the chain transfer segment typically extends opposite to the normal direction of circulation of the sprocket set, from a chain link which is the last chain link engaged between two final teeth of a final pair of teeth of the sprocket from which the chain is being transferred, to a chain link which is the first link engaged between two first teeth of a first pair of teeth of the sprocket to which the chain is being transferred, and whereby in at least one chain transfer circumferential area of the multisprocket unit, corresponding to the chain shifting in the shifting direction from a smaller sprocket to a larger sprocket, design measures are applied to the sprockets in this chain transfer circumferential area, to facilitate the shifting of the chain between the two sprocket wheels, at least in the shifting direction from the smaller sprocket to a larger sprocket, and to define the path of the corresponding chain transfer segment.

2. Background Information

DE-C2 28 37 270 discloses a known bicycle derailleur with a chain and a set of sprockets, the set of sprockets having at least one smaller sprocket and at least one larger sprocket oriented coaxially to and at some distance from this larger sprocket. The larger sprocket has at least two teeth which are designed to facilitate engagement with the chain. During the shifting process, the chain must apparently be engaged essentially at all times with, one one hand, a link pin between two teeth of a pair of teeth of the larger sprocket, and, on the other hand, with a link pin between two teeth of a pair of teeth of the smaller sprocket, and thereby, the chain, i.e. in its path between these two link pins, it must apparently extend tangentially to the smaller sprocket and bridge the distance between the pairs of teeth of the two sprockets. The distance from the midpoint of the one pair of teeth, between which the one link pin is engaged, and the midpoint of the other pair of teeth, between which the other link pin is engaged, must thereby apparently be an integral multiple of the chain pitch, and the two teeth of the pair of teeth of the larger chain wheel must apparently be designed or oriented to facilitate their engagement with the chain.

In the known embodiment, there are teeth over essentially the entire circumference of the larger sprocket. Some of the teeth are shortened to facilitate the transfer of the chain. On the larger sprocket, there are two pickup teeth, possibly safety or guide teeth, one of which is designed to be engaged between two inner link plates, and the other to be engaged between two outer link plates. Both pickup teeth have engagement flanks for the engagement with the link pins. Both pickup teeth are made thinner by setting the teeth toward the smaller sprocket. On account of this thinning, which is designed to facilitate the transfer of the chain from the smaller sprocket to the larger sprocket, there tends hardly to be essentially any possibility of applying additional design measures to these teeth, to facilitate the transfer from the larger sprocket to the smaller sprocket.

OBJECT OF THE INVENTION

The object of the invention is to make possible a further simplification of the transfer, in particular from the smaller sprocket to the larger sprocket, but also, if necessary, from the larger sprocket to the smaller sprocket. In particular, the object of the invention is to make it possible, when a transfer from the smaller sprocket to the larger sprocket must be made under load, to accomplish this transfer quietly and smoothly, and so that the chain is engaged as quickly as possible with the newly-selected sprocket.

SUMMARY OF THE INVENTION

The invention teaches that this object can be achieved by the combination of the following characteristics:

a) In the chain transfer circumference area corresponding to the shift from the smaller sprocket to the larger sprocket, one tooth is preferably omitted on the larger sprocket, thereby forming a double tooth space, which in the normal direction of circulation precedes the first tooth of the first pair of teeth of the larger sprocket.

b) On the larger sprocket, on its side surface facing the smaller sprocket, in the base area of a tooth which precedes the double tooth space in the normal direction of circulation, if desired, a link support plate is formed in the leading terminal area of the double tooth gap, which support plate, in the normal direction, preferably trails the trailing last tooth of the last tooth pair of the smaller sprocket;

c) As a result of the link support plate and a base of the double tooth space, there is, viewed in the axial direction, essentially a path of the chain transfer segment which is curved or bent convexly, radially outwardly, and is forced inside the chain transfer circumference segment between the first pair of teeth of the larger sprocket and the last pair of teeth of the smaller sprocket, whereby the curved chain transfer segment is confluent with the tooth space between the last two teeth of the last pair of teeth of the smaller sprocket;

d) The first tooth of the first pair of teeth of the larger sprocket leading in the normal direction of circulation is designed for engagement both between the link plates of an inner plate pair and also between the link plates of an outer plate pair.

It has been determined that there is an excellent shifting action under load, in the configuration contemplated by the invention. It has also been shown that the derailleur, as claimed by the invention, preferably has a high resistance to wear both on the chain side and on the sprocket side. This favorable resistance to wear may be due in particular to the presence of the double tooth space since, even if, in the double tooth space of the larger sprocket there is a spur which, in the event of a reverse movement of the chain, is designed to essentially guarantee the lateral position of the chain and which does not act as a tooth, the pitch of the chain in relation to its plane of circulation tends to generate less wear than in similar known devices, because the pitch angle in relation to the plane of circulation is essentially reduced. Thanks to the channel formed by the double tooth space of the larger sprocket for transfer of the chain during shifting from the smaller sprocket to the larger sprocket, there is essentially no need for a shortening of the teeth, of the larger sprocket, which participate in the transfer. The torque transmission action at the points of engagement between the chain links and the teeth is essentially improved both during the shifting process and also during normal operation, which in turn can have positive effects on the wear experienced by the equipment. As a result of the presence of the channel in the form of the double tooth space of the larger sprocket, one and the same tooth between a pair of link plates, regardless of whether it is an inner pair of link plates or an outer pair of link plates, is essentially always active as the first tooth of the new, larger sprocket to which the chain is being transferred. Therefore, at most, essentially all that is required is a machining of this one tooth with regard to the shifting of the chain from the smaller sprocket to the larger sprocket. Consequently, if there is essentially no need for a machining of additional teeth to serve this purpose, additional teeth are available for machining which will facilitate the shifting of the chain from the larger sprocket to the smaller sprocket, without any danger that as a result of double machining, with regard to the two directions of shifting, there is any need for any work which may cause excess wear and may increase the danger that a tooth will break. In other words, in accordance with at least one preferred embodiment of the present invention, if there is no need to machine additional teeth for the purpose of facilitating the shifting of the chain from the smaller sprocket to the larger sprocket, then such additional teeth could be machined instead for the purpose of facilitating the shifting of the chain from the larger sprocket to the smaller sprocket. Because such additional teeth will not be doubly machined with regard to the two directions of shifting, the danger of inviting excess wear of the teeth, which could otherwise increase the risk that a tooth will break, can be avoided.

It has also been determined that the configuration contemplated by at least one preferred embodiment of the present invention is relatively insensitive to malfunctions, which can occur when there is wear in the shifting path, which causes the chain, during shifting from the smaller sprocket to the larger sprocket, to move "too far" in the direction of the larger sprocket. It has also been determined that on the derailleur as contemplated by at least one preferred embodiment of the present invention, the risk of the breaking of individual link plates can be reduced. In known solutions, this danger occurs frequently when, in the transfer segment, as a result of the pitch of the transfer segment in relation to its plane of circulation, a load is applied to two inner plates as a result of an increase in the distance between them caused by the tooth engaged between them, and as a result the outer link plates adjacent to the end of the link pin are forced apart by the link pin.

In at least one configuration contemplated by at least one preferred embodiment of the present invention, the link support plate can significantly facilitate the ascent of the chain in the radial direction relative to the larger sprocket to which the chain is to be shifted. This may be an additional reason why a shortening of teeth, which would result in decreased engagement, is essentially not necessary. This link support plate essentially promotes the convex curvature of the chain transfer segment. This curved path essentially contributes to lengthening the chain transfer segment compared to a hypothetical linear curve, with the result that the load on the chain, caused by the chain's pitch in relation to the chain's plane of circulation, is further reduced.

When the description of the invention herein speaks of sprockets, the sprockets in question are essentially both the set of sprockets facing the rear wheel of a bicycle and the chainwheels of a crankset. In the context of the present invention, the example illustrated is the set of sprockets on the rear wheel. Theoretically, this example can also be the sprockets of a crankset, but in this regard, certain modifications may be necessary, so that in the case of a rear wheel derailleur, the unloaded return strand of the chain approaches the sprocket set, while in the case of a crankset, the approach point is where the tension strand of the chain, which is under load in the normal direction of rotation, approaches the sprocket set.

The link support plate can essentially be formed by the radially inside edge of a relief-type depression in one of the lateral surfaces of the large sprocket facing the smaller sprocket. The relief-like depression thereby has a leading edge which runs essentially radially in relation to the axis of the multisprocket unit and is the leading edge in the normal direction of rotation, whereby a link plate adjacent to this leading edge in the axial direction also runs past this leading edge. Therefore an entire link plate essentially cannot enter into the relief-like depression, but as a result of the leading edge, the curvature of the chain in relation to its plane of rotation is influenced. An additional advantage is that the relief-like depression, in an area in front of a leading end of the link support plate corresponding to the normal direction of circulation, is expanded radially inward toward the axis of the multisprocket unit.

To facilitate the engagement of the leading first tooth of the first tooth pair of the larger sprocket in the normal direction of rotation between two link plates, in particular between two inner link plates, the invention teaches that it is possible to bevel, or slope, the leading first tooth of the first pair of teeth of the larger sprocket essentially on the lateral surface of said tooth that is farther from the smaller sprocket radially outward and toward the smaller sprocket.

To prevent a premature engagement of the chain to be shifted to the larger sprocket with teeth of the larger sprocket, i.e. in a manner of speaking, to give such teeth, which are not to be engaged as the first teeth during the shifting to the larger sprocket, a chain throw-off function, then at least some of those teeth of the larger sprocket, which are not identical to the leading first tooth of the first pair of teeth of the larger sprocket, can preferably be bevelled radially outward and away from the smaller sprocket on their side facing the smaller sprocket, and at least, and preferably, in a radially outer area of their radial height.

During reverse movement of the chain caused by reverse pedalling of the crankset, to provide protection under all circumstances against lateral slippage of the relaxed upper strand of the chain in the chain runout area (which becomes the approach area to a rear wheel derailleur), it is possible to insert, in place of the missing tooth in the double tooth space of at least the larger sprocket, a spur which, if it is axially adjacent to an inner plate, preferably lies outside the space between this inner plate pair, and namely on the outside of that inner plate which is farther from the smaller sprocket. If the spur is axially adjacent to an outer plate pair, then the spur preferably projects into the space between the plates of this outer plate pair. But, preferably, this spur will intentionally not be designed as a tooth, since if it were designed as a tooth, it could possibly not perform the channel function of the double tooth space. This spur must preferably, in particular, be short enough that it in no case is engaged in torque transmission engagement with the chain. If a torque transmission function of this spur is prevented, then it is essentially guaranteed that this spur will essentially never be under load, even when the derailleur is under load. If the absence of a load on this spur is guaranteed when torque is being transmitted between the chain and the sprocket, this spur can essentially be designed as thin as desired both in the circumferential direction of the sprocket and also in the transverse direction of the sprocket. The opportunity to make this spur thin also essentially means that the spur will not interfere with the formation of the channel in the area of the double tooth gap, regardless of whether the spur is in contact on the outside with an inner link plate, or projects between a pair of outer plates.

It has been determined that with the configuration of the derailleur described above, as a result of the double tooth space in the larger sprocket, there is also a preferential shifting in this area, if the chain is to be shifted from the larger sprocket to the smaller sprocket. This preferential shifting is desirable at one or more defined points, although the shifting from the larger sprocket to the smaller sprocket would appear to be less critical than the shifting of the chain from the smaller sprocket to the larger sprocket, for reasons which will be explained below. In addition to the double tooth gap on the larger sprocket, the double tooth gap which may also be present on the smaller sprocket can also contribute to this preferential shifting from the larger sprocket to the smaller sprocket. Additional measures can also be applied to teeth of the larger sprocket to facilitate the shifting of the chain from the larger sprocket to the smaller sprocket, in the chain transfer circumference area designed for shifting from the smaller sprocket to the larger sprocket.

Such a measure could preferably consist of the fact that the trailing first tooth of the first pair of teeth of the larger sprocket and/or the first tooth of the larger sprocket following this trailing first tooth in the normal direction of circulation has bevels on the side facing the smaller sprocket, in such a manner that the bevelled surfaces—when viewed in the radial direction from radially outward—run forward and away from the smaller sprocket in the normal direction of circulation. If both teeth, i.e. both the trailing first tooth of the larger sprocket and also the tooth following it in the normal direction of circulation, have such bevels, then a chain transfer segment corresponding to a shift of the chain from the larger sprocket to the smaller sprocket, when the chain's inner plate pair axially adjacent the trailing first tooth of the larger sprocket, with the outside of this inner plate disposed farther from the smaller sprocket, can be in contact with the bevel of the trailing first tooth of the first pair of teeth of the larger sprocket. If the axial outer plate pair of the chain transfer segment is axially adjacent the trailing first tooth of the first pair of teeth of the larger chain wheel, this first tooth is preferably engaged between the outer link plates of this outer plate pair; consequently, an inner link plate disposed farther from the smaller sprocket of an inner pair of plates following the above-mentioned pair of outer plates will be in contact with the bevel of the tooth of the larger sprocket trailing the first tooth of the first pair of teeth of the larger sprocket.

But to facilitate the shifting of the chain from the larger sprocket to the smaller sprocket, it is also conceivable to apply measures to those teeth of the larger sprocket which precede the double tooth space in the direction of circulation of the larger sprocket, and in particular on that tooth of the larger sprocket which immediately precedes the double tooth space, and possibly also on that tooth which is the second tooth preceding the double tooth space of the larger sprocket. In this manner, the pitch of the chain in relation to its plane of circulation can be initiated as early as in the vicinity of these teeth.

It is possible that the two sprockets, i.e. the larger sprocket and the smaller sprocket, are part of a larger group of sprockets of the multisprocket unit, in which case either the sprocket previously regarded as the larger sprocket would be the smaller sprocket in relation to an even larger sprocket adjacent to it, and/or the sprocket previously regarded as the smaller sprocket would be the larger sprocket in relation to a sprocket even smaller than itself, and whereby the indicated relationships apply for at least some of the adjacent sprockets which together form a pair of sprockets. The above-mentioned spur would appear to be required, if at all, essentially only in the vicinity of the double tooth space of the largest sprocket or of the largest sprockets.

To accomplish the shifting of the chain between two neighboring sprockets as quickly as possible after the shifting order is given by means of the chain shift lever, at least one preferred embodiment of the present invention contemplates that one pair of sprockets of a multisprocket unit has a number of chain transfer circumferential areas distributed over the circumference, in which the above-mentioned configurations, at least of the larger sprocket, but preferably also of the smaller sprocket, are present.

The formation of a double tooth space, as contemplated by at least one preferred embodiment of the present invention, at least with respect to the larger sprocket, results in a modified operation of the system formed by the chain and the sets of sprockets; this is true in particular if it is recalled—and it cannot be altogether ruled out—that the double tooth space can be achieved simply by omitting a tooth or "filing the tooth away" on a conventional sprocket with a constant tooth pitch over its entire circumference. A shifting action which is more pleasant for the user can be achieved if, when at least one tooth is omitted between two subsequent teeth of a sprocket, thereby forming a multi-tooth space, in particular a double tooth space, the contour of the multiple tooth space and the contour of the tooth space of a tooth space immediately following this multi-tooth space are coordinated with one another so that when a corresponding number of chain links are placed in these tooth gaps, their link axes lie at least approximately on a common connecting line, whereby the leading chain link in the multi-tooth space and the chain link located in the subsequent tooth space, at least during runout into the tension strand, participate jointly and proportionally in the transmission of the torque to the trailing flank of the tooth preceding them, and during the winding of the strand under tension onto the chainwheel of a driving set of sprockets, can participate jointly in the transmission of the torque to the trailing edge of the tooth preceding them.

In general, then, the midpoints of the tooth spaces of the sprocket essentially form an irregular polygon, whereby the link axes lying on a common connecting line form larger sides of the polygon.

In summary, one aspect of the invention resides broadly in a derailleur arrangement for a manually powered vehicle, such a vehicle having at least one wheel, at least one wheel hub mounted on the at least one wheel, and a chain for providing a torsional force to be transferred to the at least one wheel hub, the derailleur arrangement comprising: first sprocket means; the first sprocket means having: means for connecting with a wheel hub of the manually powered vehicle; means for receiving a torsional force from the chain and transferring the torsional force to the hub; second sprocket means; the second sprocket means having: means for connecting with a wheel hub of the manually powered vehicle; means for receiving a torsional force from the chain and transferring the torsional force to the hub; second sprocket means; the first sprocket means and the second sprocket means having a common axis of rotation; the first sprocket means and the second sprocket means each having a plane of rotation; means for transferring the chain between the first sprocket means and the second sprocket means; the chain transfer means comprising means for selectively imparting a displacement to the chain in either of a first direction and a second direction, the first direction being substantially opposite the first direction, the first and second directions being generally perpendicular to the plane of rotation of each of the first sprocket means and the second sprocket means; means for facilitating transfer of the chain between the first sprocket means and the second sprocket means; the means for facilitating transfer comprising: recess means disposed in at least one of the first sprocket means and the second sprocket means, the recess means having means for accommodating and supporting a portion of the chain during transfer of the chain between the first sprocket means and the second sprocket means and for guiding the chain, during transfer, between the first sprocket means and the second sprocket means; and the recess has a surface having a portion extending substantially at a right angle with respect to the planes of rotation of the first sprocket means and the second sprocket means.

Another aspect of the invention resides broadly in a derailleur arrangement for a manually powered vehicle, such a vehicle having at least one wheel, at least one wheel hub mounted on the at least one wheel, and a chain for providing a torsional force to be transferred to the at least one wheel hub, the derailleur arrangement comprising: first sprocket means; the first sprocket means having: means for connecting with a wheel hub of the manually powered vehicle; means for receiving a torsional force from the chain and transferring the torsional force to the hub; second sprocket means; the second sprocket means having: means for connecting with a wheel hub of the manually powered vehicle; means for receiving a torsional force from the chain and transferring the torsional force to the hub; second sprocket means; the first sprocket means and the second sprocket means having a common axis of rotation; the first sprocket means and the second sprocket means each having a plane of rotation; means for transferring the chain between the first sprocket means and the second sprocket means; the chain transfer means comprising means for selectively imparting a displacement to the chain in either of a first direction and a second direction, the first direction being substantially opposite the first direction, the first and second directions being generally perpendicular to the plane of rotation of each of the first sprocket means and the second sprocket means; the first sprocket means comprising a plurality of teeth; the second sprocket means comprising a plurality of teeth; the plurality of teeth of the first sprocket means and the second sprocket means comprising the means for receiving a torsional force; means for facilitating transfer of the chain between the first sprocket means and the second sprocket means; the means for facilitating transfer comprising: channel means for accommodating the chain as the chain is being transferred between the first sprocket means and the second sprocket means; the channel means being defined by the plurality of teeth of at least one of the first sprocket means and the second sprocket means; the channel means being oriented at a skew with respect to the planes of rotation of the first sprocket means and the second sprocket means; the plurality of teeth of at least one of the first sprocket means and the second sprocket means forming the channel means as a substantially straight path for permitting a substantially straight transfer of the chain, with respect to the planes of rotation of the first sprocket means and the second sprocket means, between the first sprocket means and the second sprocket means.

Yet another aspect of the invention resides broadly in a derailleur arrangement for a manually powered vehicle, such a vehicle having at least one wheel, at least one wheel hub mounted on the at least one wheel, and a chain for providing a torsional force to be transferred to the at least one wheel hub, the derailleur arrangement comprising: first sprocket means; the first sprocket means having: means for connecting with a wheel hub of the manually powered vehicle; means for receiving a full torsional force from the chain and transferring the full torsional force to the hub; second sprocket means; the second sprocket means having: means for connecting with a wheel hub of the manually powered vehicle; means for receiving a full torsional force from the chain and transferring the full torsional force to the hub; second sprocket means; the first sprocket means and the second sprocket means having a common axis of rotation; the first sprocket means and the second sprocket means each having a plane of rotation; means for transferring the chain between the first sprocket means and the second sprocket means; the chain transfer means comprising means for selectively imparting a displacement to the chain in either of a first direction and a second direction, the first direction being substantially opposite the first direction, the first and second directions being generally perpendicular to the plane of rotation of each of the first sprocket means and the second sprocket means; the first sprocket means comprising a plurality of teeth; the second sprocket means comprising a plurality of teeth; a plurality of teeth of the first sprocket means and the second sprocket means comprising the means for receiving a full torsional force; means for facilitating transfer of the chain between the first sprocket means and the second sprocket means; the means for facilitating transfer comprising: means for locally substantially reducing on: at least one of the first sprocket means and the second sprocket means, and the chain, the transfer of the full torsional force between: at least one of the first sprocket means and the second sprocket means, and the chain; the means for locally substantially reducing the transfer of full torsional force being disposed between two teeth of the plurality of teeth for transferring full torsional force.

BRIEF DESCRIPTION OF THE DRAWINGS

The invention is explained in greater detail below with reference to the accompanying figures, in which.

DESCRIPTION OF THE PREFERRED EMBODIMENT

The term "derailleur" may be considered to be interchangeable with the term "derailleur arrangement" herein, where appropriate.

Figure 1:
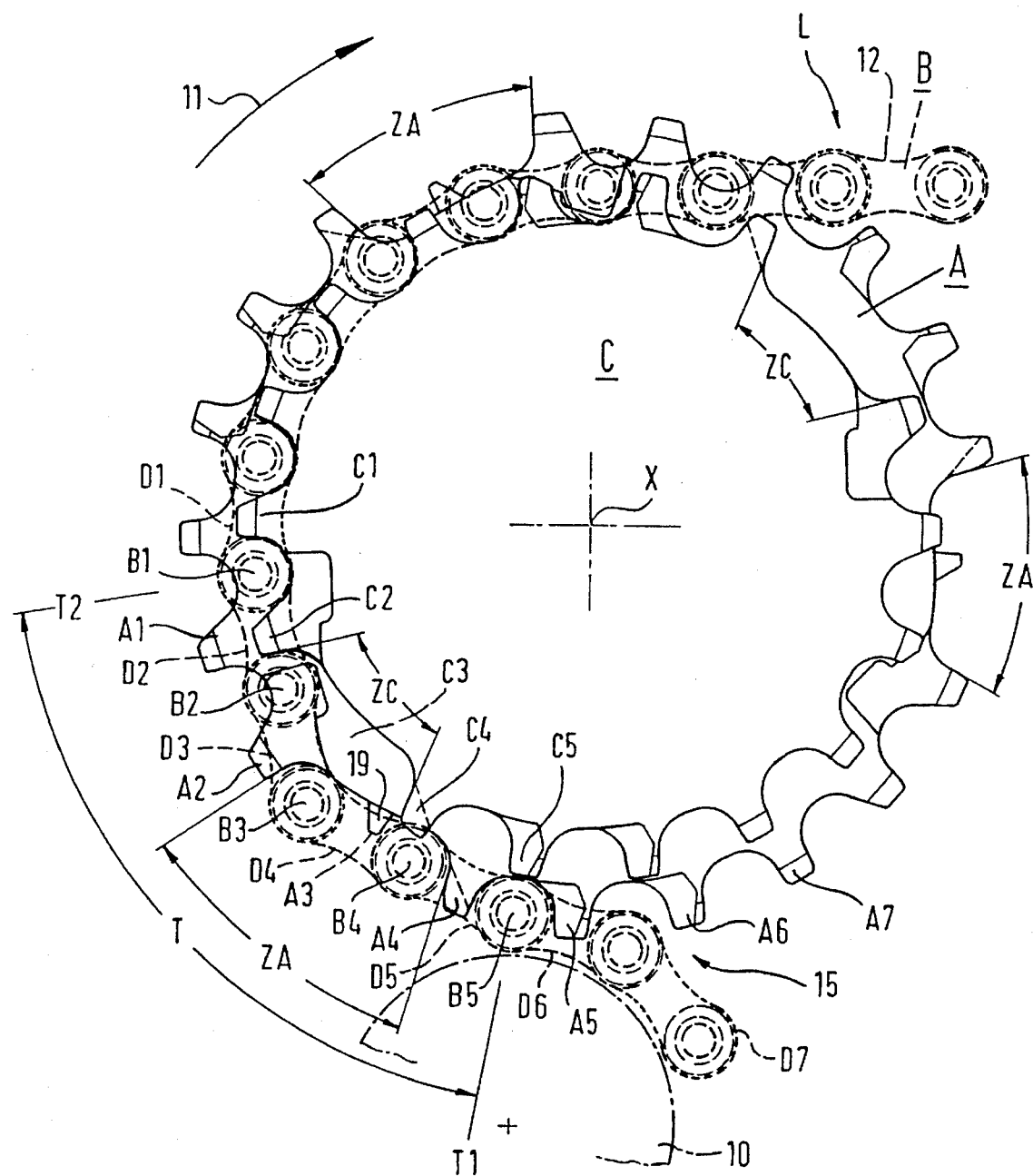
FIG. 1 represents a sprocket set on the rear wheel of a bicycle, with a chain and a chain shifting device.

FIG. 1 shows two sprockets with the common axis of rotation (X) of a set of sprockets on the rear wheel of a bicycle, whereby the larger sprocket is designated A and the smaller sprocket is designated C. In the illustrated example, the large sprocket A has 21 teeth and the small sprocket C has 18 teeth. A chain which connects the rear set of sprockets with a crankset chainwheel of the bicycle is designated B. The chain B runs over the guide wheel 10 of a derailleur in the set of sprockets A, C. The normal direction of chain circulation corresponding to forward motion is indicated by the arrow 11. "12" designates the upper strand of the chain running tangential to the crankset, and "15" designates the approach of the chain B into the rear wheel set of sprockets.

FIG. 1 illustrates a shifting process from the smaller sprocket C to the larger sprocket A. In the upper half of FIG. 1, the chain B is still engaged with the smaller sprocket C. In the lower half of FIG. 1, a portion of the chain B is already in contact with the larger sprocket A.

The transfer of the chain B from the small sprocket C to the large sprocket A has been initiated by a motion of the guide wheel 10 perpendicular to the plane of the drawing at a time prior to the time pictured in FIG. 1, at which time the tooth A1 of the large sprocket A was still ahead of the area of the guide wheel 10. In other words, in accordance with at least one preferred embodiment of the present invention, the transfer of the chain B from the small sprocket C to the large sprocket A has been initiated by a motion of the guide wheel 10 perpendicular to the plane of the drawing at a time prior to the time pictured in FIG. 1, at which prior time the tooth A1 of the large sprocket A had not yet arrived in the vicinity of guide wheel 10.

A transfer zone of the chain has thereby been formed, which zone is designated overall by T, the trailing end of which zone T is designated T1 and the leading end of which zone T is designated T2. As the set of sprockets A,C continues to rotate, this transfer zone continues to travel in the direction of rotation 11. When the trailing end T1 of the transfer zone T reaches the runout area L as illustrated in FIG. 1, in which runout area L the chain B is preferably released from the set of sprockets, whence the chain B proceeds toward the set of sprockets on the front crankset, and the action of shifting from the small sprocket C to the large sprocket A is essentially completed.

Thus, in accordance with at least one preferred embodiment of the present invention, it will be appreciated that the arrangement illustrated in FIG. 1 could preferably relate to a rear set of sprockets in a bicycle such that, after chain B passes through runout area L, it will preferably proceed to a front crankset.

Figure 2:
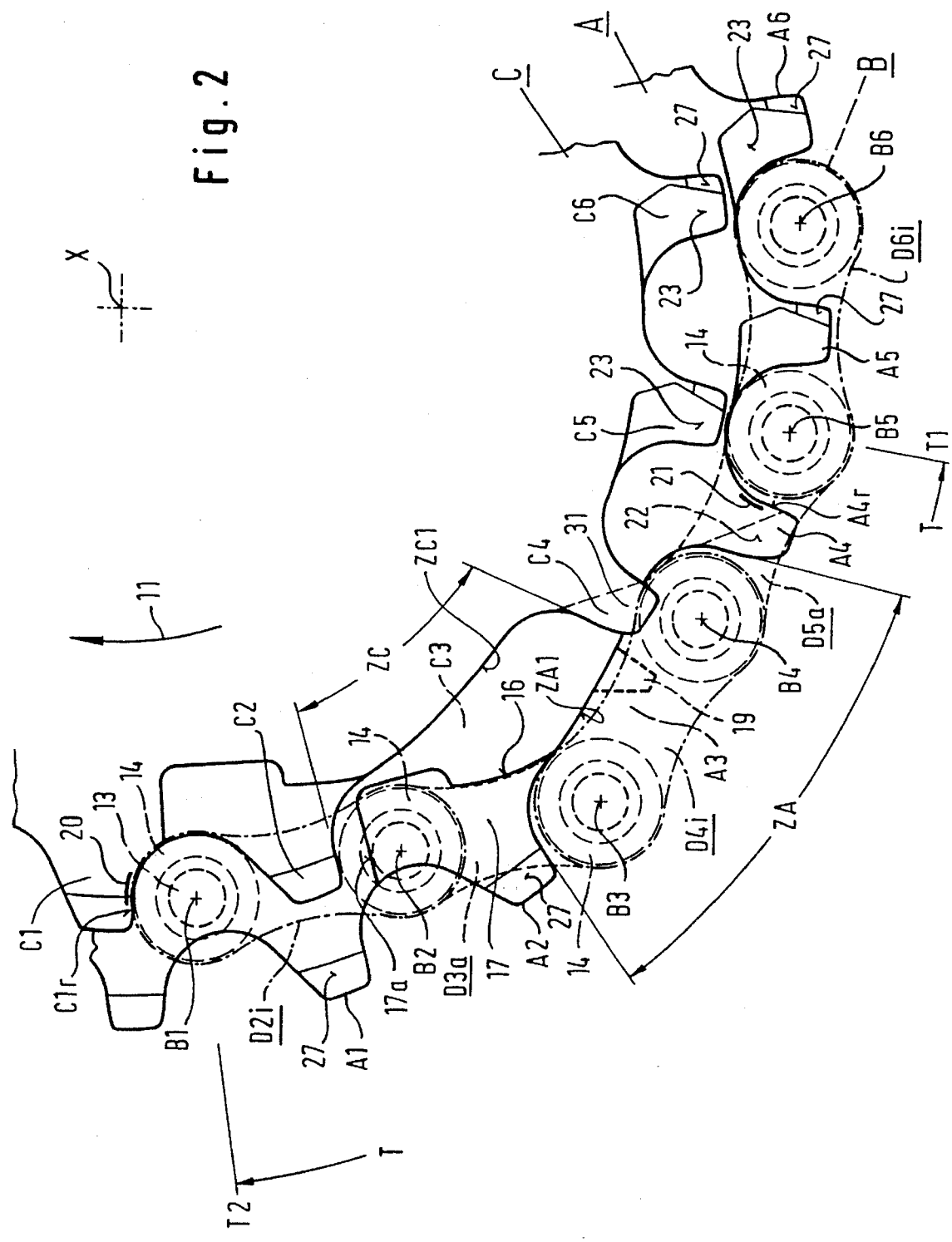
FIG. 2 shows a section of FIG. 1 on an enlarged scale, during the transfer of the chain from a smaller sprocket to a larger sprocket.

The action of shifting from the small sprocket C to the large sprocket A can be explained by considering the transfer zone T, which is illustrated on an enlarged scale in FIG. 2.

In FIG. 2, which illustrates the transfer region T on an enlarged scale, there is a chain hinge point B1. This chain hinge point B1 is preferably formed in the conventional manner by a pin 13 and a chain roller 14. The chain hinge point B1 can be thought of as that chain hinge point which, before the initiation of the shifting motion of the guide wheel 10, is still essentially in full engagement with the small sprocket C, and is engaged in a tooth space between the teeth C1 and C2 of the small sprocket C. The chain hinge point B5, which is preferably designed essentially in exactly the same manner as the chain hinge point B1, can be thought of as the first chain hinge point which, after the initiation of the shifting motion of the guide wheel 10, comes essentially into full engagement with the large sprocket A, namely in the space between the two teeth A4 and A5 of the large sprocket A. The large sprocket A, between the successive teeth A2 and A4, preferably has a space where a tooth is missing, which space is designated A3. In this missing tooth space A3, there can preferably be a spur, which is indicated at A3 in broken lines; this spur will be explained in greater detail below.

Figure 3:
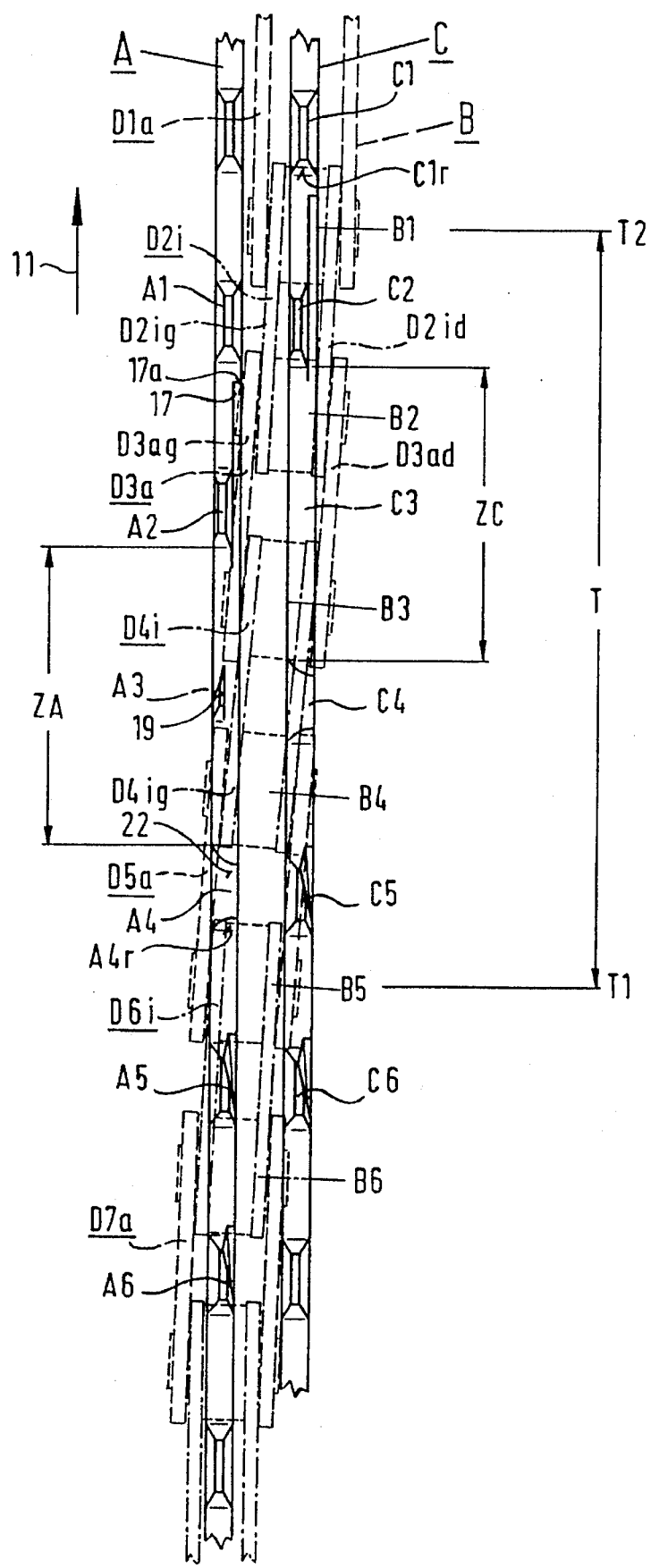
FIG. 3 shows a view of the chain transfer area illustrated in FIG. 2 from radially outside.

The small sprocket C, between its teeth C2 and C4, also preferably has a space C3 where a tooth is missing. Thus, the two spaces A3 and C3 can essentially preferably result in larger spaces ZA and ZC between teeth. These tooth spaces ZA and ZC preferably facilitate the transfer of the chain B from the small sprocket C to the large sprocket A. This is illustrated in FIG. 3, which also shows the transfer zone T and the tooth spaces ZC and ZA.

The following information regarding the design of the chain B should also be noted, to make the rest of the explanation easier to understand:

Chain B, between successive chain hinge points, e.g. between the chain hinge points B1 and B2, preferably has an inner pair D2$i$ of link plates. The left-hand link plate of a pair of link plates in FIG. 3 is designated with the index g; this is the link plate which can be thought of as being toward the larger sprockets of a set of sprockets, while the right-hand link plate is designated by the index d. Accordingly, the pair D2$i$ of link plates preferably includes the link plates D2$ig$ and D2$id$, and the outer pair D3$a$ of link plates preferably includes the two link plates D3$ag$ and D3$ad$. Between the other chain hinge points B3 and B6, there preferably follow, in succession, an inner pair D4$i$ of link plates, an outer pair D5$a$ of link plates, another inner pair D6$i$ of link plates, etc.

It will be understood, in accordance with at least one preferred embodiment of the present invention, that "outer" pairs of link plates preferably alternate with "inner" pairs of link plates, such that there is essentially a wider gap between link plates of an "outer" pair of link plates than between link plates of an "inner" pair of link plates.

The chain roller 14 of the chain hinge point B1 is shown as being still in essentially full engagement with two successive teeth C1 and C2 of the small sprocket C. As shown, the chain roller 14 of the chain hinge point B2 has already been lifted somewhat out of the enlarged tooth space ZC. The next chain hinge point B3 is shown as being not in driving engagement with the tooth A2, but the left link plate D3ag of the outer pair D3a of link plates in FIG. 3 is shown as being to the right of the tooth A2, whereby the radial height of the chain hinge point B3 is essentially determined by the fact that the left link plate D3ag of the pair D3a of link plates is shown as lying on a base plate 16 of the large sprocket A, which base plate 16 preferably borders a relief-type recess 17 in the front side, facing the observer in FIG. 2 and on the front right side in FIG. 3.

Thus, in accordance with a preferred embodiment of the present invention, in the arrangement shown in FIGS. 2 and 3, the left link plate D3ag of the pair of link plates D3a preferably lies on an area, base plate 16, which may be considered to be a ramp or lower portion of a recess 17. As shown, a lower portion of left link plate D3ag may preferably at least partially lie on the base plate 16. In accordance with at least one preferred embodiment of the present invention, the recess 17 and the base plate 16 may preferably be so arranged and dimensioned such that an essentially smooth and optimal positional transition of link plate D3ag takes place between the sprockets C and A. It will be appreciated, in accordance with at least one preferred embodiment of the present invention, that corner 17a of recess 17 may preferably act as a fulcrum and thereby have positioned thereagainst a portion of link plate D3ag, to assist in the aforementioned transition.

The chain hinge point B3 is therefore shown as being offset in relation to the tooth A2 perpendicular to the plane of the drawing in FIG. 2, and to the right in FIG. 3, and is shown as essentially not being in a driving engagement with the tooth A2, as shown in particular in FIG. 3. The tooth A4 is shown as being engaged between the two link plates of the outer pair D5a of link plates. The chain hinge point B5 shown as being the first hinge point which is engaged with its chain roller 14 between two successive teeth A4 and A5 of the large sprocket A.

FIG. 2 shows that the hinge point B2 is raised from the bottom ZC1 of the enlarged tooth space ZC; that essentially means that the transfer chain segment B1–B5, even with its forwardmost section B1, B2, essentially, in accordance with at least one preferred embodiment of the present invention, does not approach the small sprocket C tangentially, but at an acute angle to a tangent to the small sprocket C, which tangent can be thought of as being laid, or defined, by the hinge point B1.

FIG. 3 shows that the enlarged tooth spaces ZC and ZA can, in accordance with at least one preferred embodiment of the present invention, preferably form a "chain channel", and facilitate the transfer of the chain B from the hinge point B1 engaged with the small sprocket C to the hinge point B5 engaged with the large sprocket A. When the chain transfer is initiated from the small sprocket C to the large sprocket A, the left link plate D3ag of the outer pair D3a of link plates—to the rear in FIG. 2 and to the left in FIG. 3—is preferably pushed toward a relief-like recess 17, so that the radially inner edge of this rear link plate D3ag is preferably in contact with the ramp, or base plate, 16 which is adjacent radially inward to the relief-like recess 17 during the further rotation of the set of sprockets. It should thereby be noted that the rear link plate D3ag of the outer pair D3a of link plates essentially, in accordance with at least one preferred embodiment of the present invention, does not fall completely into the recess 17, but is tipped around its rear end corner 17a.

The transfer of the chain B from the small sprocket C to the large sprocket A, as mentioned above, is preferably initiated by a motion of the guide wheel 10 perpendicular to the plane of the drawing in FIG. 1 and, with relation to FIG. 3, by a movement of the guide wheel 10 from right to left. As a result of this movement of the guide wheel 10 from right to left (with relation to FIG. 3), preparations are essentially made for the transfer of the chain B. But the chain B essentially cannot be transferred to the large sprocket A until the chain B is essentially in lateral contact against the teeth A1 and A2. Essentially, it is only when, during the further rotation of the set of sprockets in the direction of the arrow 11, the link plate D3ag of the outer pair D3a of link plates approaching the entry area 15 (see FIG. 1) has been lifted radially outward by the ramp 16, and the inner pair D4i of chain links coincides with the enlarged tooth space ZA, that the transfer to the large sprocket can take place, during which transfer the tooth A4 of the large sprocket A is engaged between the link plates of the outer pair D5a of link plates.

It should also be noted that even if, in accordance with at least one preferred embodiment of the present invention, there is a spur 19 in the missing tooth space A3, this spur 19 will preferably at no time essentially act as an actual tooth. In other words, spur 19 is preferably configured such that at no point will it be effective for the transmission of torque from the chain B to the large sprocket A.

As shown, preferably, in accordance with a preferred embodiment of the present invention, spur 19 may preferably have the general appearance of a considerably scaled-down tooth. Preferably, spur 19 may be scaled down to such an extent as to be incapable of transmitting torque but capable of serving as a lateral guide or stop when the chain B is being shifted between sprockets.

Preferably, as long as the transfer area T of the chain B travels from the approach point 15 to the runout area L, the chain roller 14 of the chain hinge point B5 is preferably opposite the trailing flank A4r of the tooth A4, as viewed in the direction of arrow 11, to transmit torque at area 21 (see FIG. 2). On the other hand, the chain roller 14 of the chain hinge point B1 is preferably opposite the trailing flank C1r of the tooth C1, as viewed in the direction of arrow 11, to transmit torque at area 20 (see FIG. 2). When, during the further rotation of the set of sprockets A, C, the torque transmission point 20 between the hinge point B1 and the trailing flank of the tooth C1 enters the runout area L, the chain roller 14 of the hinge point B1 is preferably raised from its engagement between the two teeth C1 and C2, the torque transmission at the point 20 is preferably eliminated and there is thence preferably a transmission of torque at the point 21 between the chain hinge point B5 and the trailing flank A4r, whereby the trailing end of the left link plate D3ag in FIG. 3 of the outer pair D3a of link plates is preferably supported in the direction of arrow 11 on the trailing end of the ramp 16 and/or on the base ZA1 of the enlarged tooth space ZA as before. As shown in FIGS. 2 and 3, the left link plate D4ig shown in FIG. 3 of the inner link plate pair D4i is preferably to the right of the spur 19, if there is such a spur.

The description of FIGS. 2 and 3 assumes, in accordance with at least one preferred embodiment of the present invention, that an inner link plate pair D4*i* preferably coincides with the area of the enlarged tooth space ZA.

Figure 4:
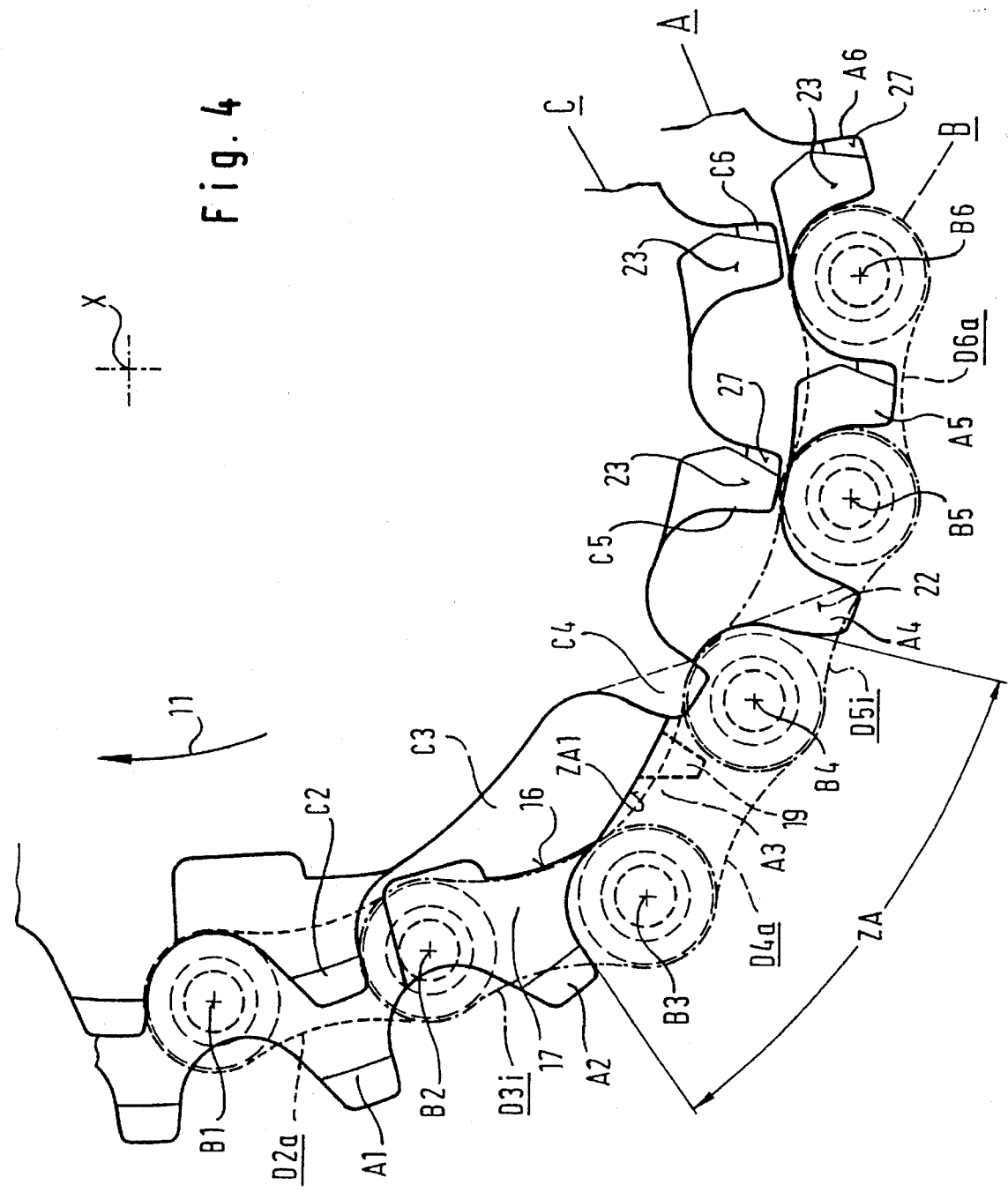
FIG. 4 shows a view as in FIG. 2, but with a different correspondence between the inner and outer pair of link plates and the sprockets.
Figure 5:
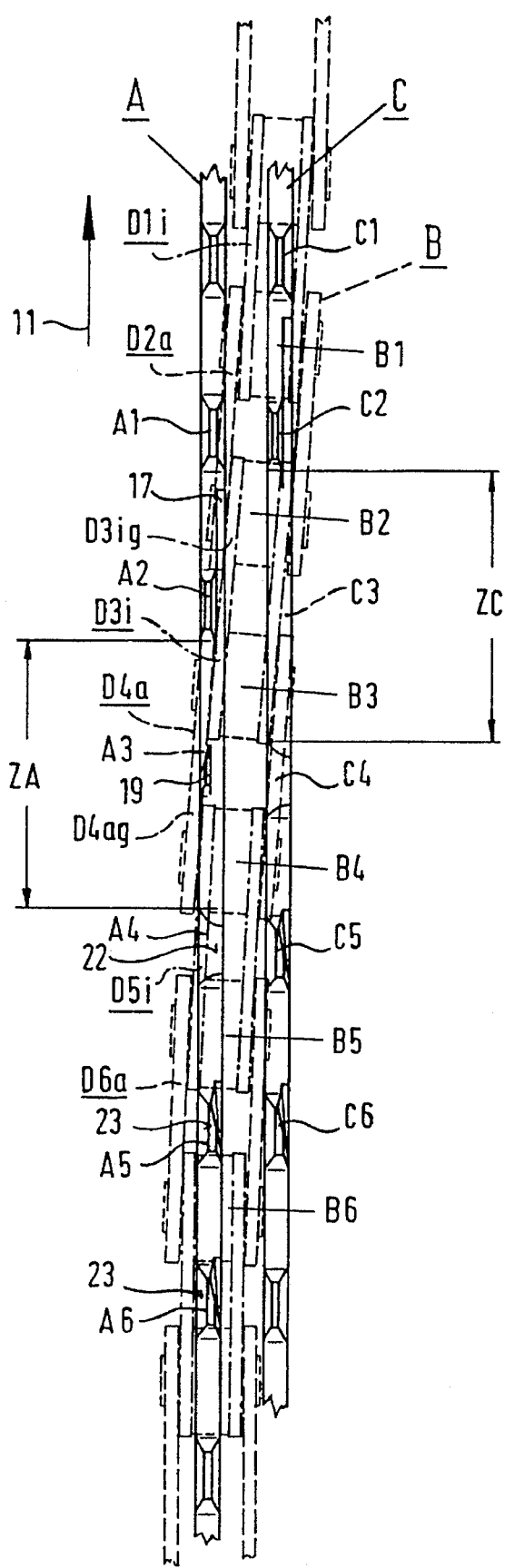
FIG. 5 shows a view of the chain transfer segment illustrated in FIG. 4 from radially outside.

The case in which an outer link plate pair D4*a* coincides with the area of the enlarged tooth space ZA is illustrated in FIGS. 4 and 5.

FIG. 5 shows that the spur 19, if any, which is present approximately at the location A3 of the missing tooth is now preferably engaged between the two link plates of the outer link plate pair D4*a*, which is essentially possible because there is no tooth at the location A3, but only the spur 19, which does not have any torque transmission function. Preferably, in accordance with at least one preferred embodiment of the present invention, spur 19 has, at most, a lateral chain guide function during reverse travel, so that this spur can be designed small enough, without the risk of an overload in the longitudinal and transverse direction of the chain, so that it can lie on one hand, as shown in FIG. 3, outside the chain and on the other hand, as shown in FIG. 5, inside the chain.

If there were a tooth at the location A3, then it would likely not be possible, on one hand, as shown in FIG. 3, for the left inner link plate D4*ig* of the inner link plate pair D4*i* to travel through the area ZA on the right side of the spur 19, and on the other hand, as shown in FIG. 5, for the left link plate D4*ag* of the outer link plate pair D4*a* to travel through the area ZA on the left side of the spur 19, so that in both cases, the subsequent tooth A4 can enter between the two link plates of the outer link plate pair D5*a* (FIG. 3) or of the inner link plate pair D5*i* (FIG. 5).

Also in the configuration illustrated in FIGS. 4 and 5, the spur 19—if any—is, in accordance with at least one preferred embodiment of the present invention, essentially never active as a tooth which interacts with the chain rollers 14 of the neighboring hinge points.

FIGS. 4 and 5 also show that, in contrast to FIGS. 2 and 3, the ramp 16 preferably corresponds to the link plate D3*ig* of the inner link plate pair D3*i*. The support of the chain hinge point B3 therefore essentially preferably results from the fact that the forward end of the left link plate D4*ag* of the outer link plate pair D4*a* illustrated in FIG. 5 is preferably supported on the base ZA1 of the extended tooth space ZA.

It is a particular advantage, as illustrated in FIG. 2 on one hand and in FIG. 4 on the other hand, that the same tooth A4 is preferably engaged, respectively, between the link plates of the outer link plate pair D5*a* and of the inner link plate pair D5*i*.

Figure 6:
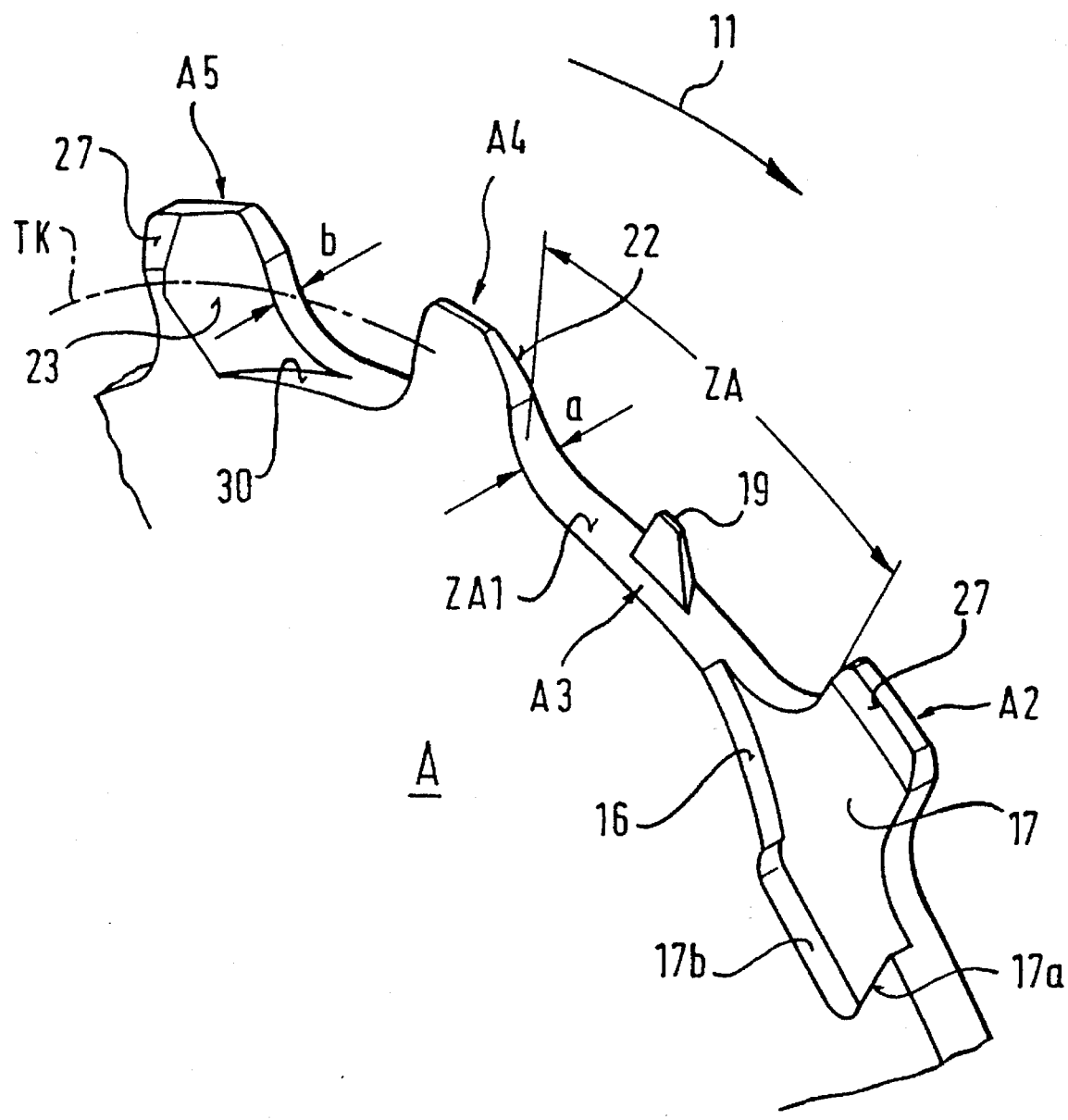
FIG. 6 shows a detail of the larger sprocket illustrated in FIGS. 1 to 5.

The tooth A4 of the large sprocket A which, during the transfer of the chain from the small sprocket C to the large sprocket A, preferably enters as the first tooth between the link plates of a link plate pair D5*a* and D5*i* respectively, can preferably be provided with a bevel 22 (FIGS. 3, 5 and 6). The bevel 22 thus can preferably result in a thinning of the tooth A4. If, independent of the correspondence of an inner link plate pair or of an outer link plate pair to the tooth space ZA, the same tooth A4 shown in FIGS. 3 and 5 will always essentially be the first one to enter between the link plates of the corresponding link plate pair D5*a* and D5*i*, then only one tooth, in this case tooth A4, is provided with the bevel 22 and therefore needs to be made thinner. With regard to the description of the process of transferring the chain B from the larger sprocket A to the smaller sprocket C, it should be noted that in this manner it becomes possible to apply other bevels to the teeth A5 and A6 as illustrated in FIGS. 2 and 4, which may be desirable with regard to the action of shifting from the larger sprocket A to the smaller sprocket C. If a bevel were also to be applied to the tooth A5, corresponding to the bevel 22 on the tooth A4, the simultaneous application of a bevel 23 (as shown) could lead to an excessive thinning of the tooth A5, which could lead to the breaking or premature wear of the tooth A5 which is active in transmitting the torque.

When the chain transfer from the small sprocket C to the large sprocket A as illustrated in FIGS. 4 and 5 is initiated, the left link plate D4*ag* of the outer link plate pair D4*a* illustrated in FIG. 5 is preferably pushed into the enlarged tooth space ZA. As the rotation proceeds in the direction indicated by the arrow 11, the positions of the inner link plate pair D3*i* and of the outer link plate pair D4*a* illustrated in FIGS. 4 and 5 preferably result, whereby the spur 19, if any, enters between the two link plates of the outer link plate pair D4*a*. If, during this process, the left link plate D3*ig* of the inner link plate pair D3*i* finds no support or insufficient support on the ramp 16, then this support can essentially preferably be replaced by the contact of the left link plate D4*ag* on the base ZA1 of the enlarged tooth space ZA.

The transfer from torque transmission between the chain B and the small sprocket C to torque transmission between the chain B and the large sprocket A on the other hand occurs as described for the situation illustrated in FIGS. 2 and 3.

Details of the large sprocket A in the vicinity of the enlarged tooth space ZA are illustrated in FIG. 6. Special note should be taken of the configuration of the relief-like recess 17 with the ramp 16, the edge 17*a* and the radially inward expansion 17*b*, as well as the configuration of the specified bevels 22 and 23. The figure also shows the base of the enlarged tooth space ZA which is designated ZA1.

The teeth A1, A2 and A5 are preferably provided with bevels 27. Upon the initiation of the shifting action from the small sprocket C to the large sprocket A, the guide wheel 10 and accordingly also the chain B are pushed toward the large sprocket A. These bevels 27 are preferably provided so that, in spite of this approach, the chain essentially cannot wind onto the tips of the teeth of the large sprocket. Although after the entry into the sprocket set, during the further rotation of the sprocket set, the chain B preferably moves radially inwardly in relation to the axis of the sprocket set, it preferably does not come into contact with the tooth tips, but instead with the bevels 27 and then preferably slides back over the bevels 27 toward engagement with the small sprocket C. Essentially, only when, during the continued rotation of the sprocket set in the direction of the arrow 11, the chain is axially opposite the relief-like recess 17 and the enlarged tooth space ZA, is the engagement with the small sprocket C preferably released, can the chain thence move under the action of the axial motion of the guide wheel in the direction away from the small sprocket C.

There is preferably no bevel 27 on the tooth A4. This tooth A4 preferably has the bevel 22 on its side away from the small sprocket, so that the tooth A4, regardless of whether it is radially flush with the outer link plate D5*a* shown in FIG. 3, or with the inner link plate D5*i* shown in FIG. 5, can be threaded between the corresponding link plates.

FIGS. 3 and 5 show that essentially none of the teeth participating in the chain transfer can exert an action which would push apart and burst a pair of link plates. This is true in particular where teeth are engaged in the inner link plate pair, i.e. in the narrow space between two inner link plates, and therefore where, in similar known systems, there was often the risk of a separation of the outer link plates from the chain rollers.

Figure 7:
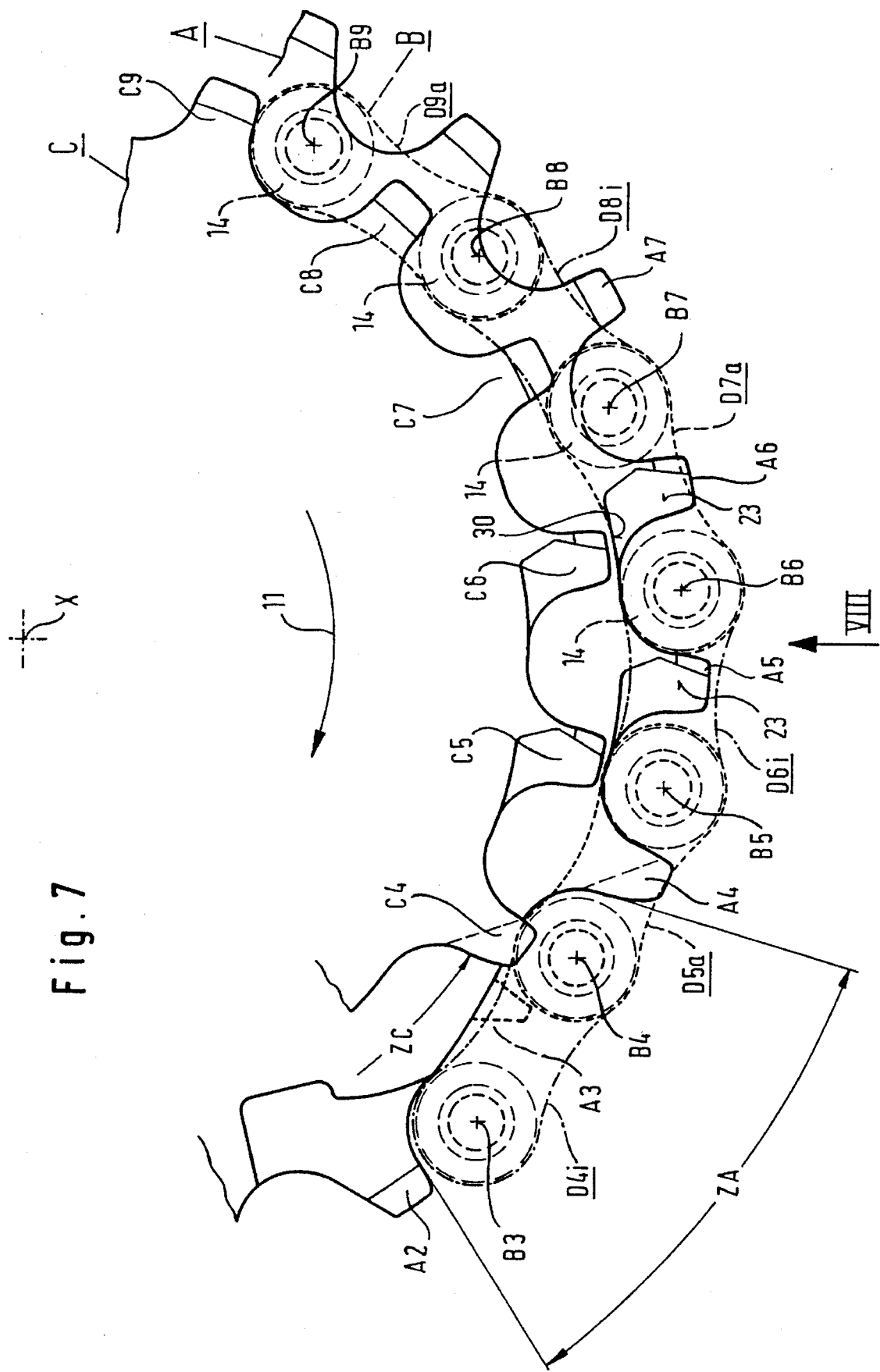
FIG. 7 shows a side view of a set of sprockets with a chain transfer segment which is formed during the shifting from the larger sprocket to the smaller sprocket.
Figure 8:
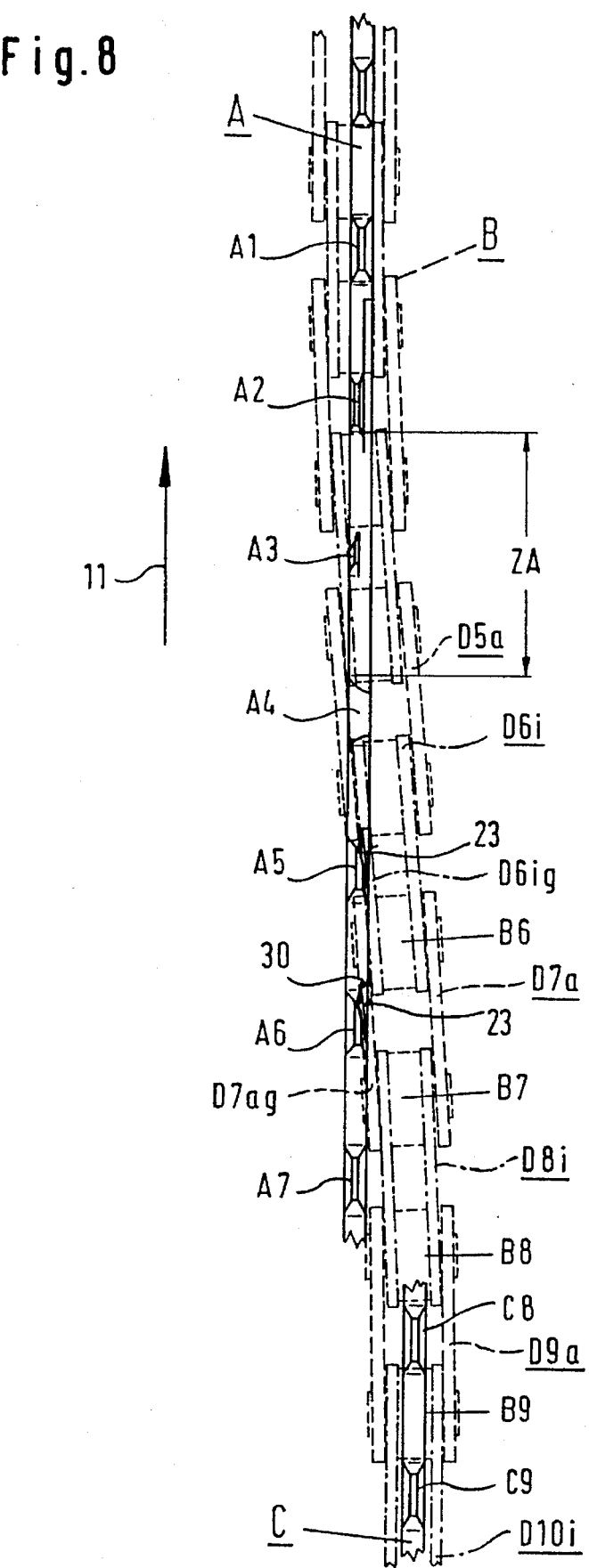
FIG. 8 shows a view in the direction of Arrow VIII in FIG. 7.

The shifting from the large sprocket A to the smaller sprocket C is illustrated in detail in FIGS. 7 and 8. For the consideration of the shifting action, FIG. 7 shows the relevant area between the tooth A2 of the large sprocket and the tooth C9 of the small sprocket.

For purposes of illustration with respect to FIG. 1 of the situation illustrated in FIG. 7, the tooth C9 is placed behind the position T1 of FIG. 1, in the direction of circulation 11, while the tooth A2 has been placed ahead of the runout area L, in the direction of circulation 11.

In FIGS. 6, 7 and 8, bevels 23 have been applied to the teeth A5 and A6, for which reference is made to FIG. 6 in particular. The teeth A5 and A6 are those teeth which, during rotation opposite to the normal direction of circulation 11, are respectively the first tooth A5 and the second tooth A6 to follow that tooth A4 which, during the shifting described above from the small sprocket C to the large sprocket A, was the first tooth engaged between the link plates of a link plate pair. In other words, the tooth A5 with the bevel 23 is that tooth which, opposite the direction of circulation 11, is the second tooth following the space A3 for the missing tooth, and the tooth A6 with the bevel 23 is the tooth which is the third tooth following the space A3 for the missing tooth.

Basically, the action of shifting from the large sprocket A to the small sprocket C can be thought of as being less critical than the action of shifting from the small sprocket C to the large sprocket A. This would appear to be true first because it is essentially easier to shift the chain B under tension from a large sprocket A to a small sprocket C, which is supported by the chain tension. An additional reason is that the transfer from a large sprocket to a small sprocket is made when the rider wants to shift from a lower gear to a higher gear; then, as a rule, there is a circumferential velocity which is significantly more favorable for the shifting action, and on the other hand there is also a lower torque, which is also favorable for the shifting action. Nevertheless, it is generally desirable to make the shift from the larger sprocket A to the smaller sprocket C as quickly, smoothly and quietly as possible. For this purpose, there are preferably bevels 23 on the teeth A5 and A6, whereby with regard to the tooth A5 in particular, reference is made to FIG. 6. The bevels 23, as shown in particular in FIGS. 6 and 8, are preferably inclined along a circumferential line TK (FIG. 6) in relation to a plane orthogonal to the axis of the sprocket set, so that in the direction of rotation 11 along the circumferential line TK, the bevel 23 is preferably at an increasing axial distance from the neighboring smaller sprocket C. This is also shown by a comparison of the tooth thicknesses b and a in the vicinity of the respective leading flank of the teeth A5 and A4, where b is preferably less than a.

If the rider wants to shift from the larger sprocket A to the smaller sprocket C as shown in FIG. 1, the guide wheel 10 is again essentially moved orthogonally to the plane of the drawing in FIG. 1, but this time toward the observer, i.e. to the right in FIG. 8. In other words, an attempt is made to push the chain B in the axial direction of the sprocket set toward the next smaller sprocket C. The transfer of the chain B is facilitated if the tooth A5 or the tooth A6 is preferably in the approach area 15 (See FIG. 1). As shown in FIG. 8, for example, the left link plate D6ig of the inner link plate pair D6i shown in FIG. 8 in the vicinity of the tooth A5 can then reach the bevelled surface 23 facing the smaller sprocket C. Then the link plate pairs D7a, D8i and D9a following the inner link plate pair D6i, as they enter the position 15, can essentially no longer become engaged with the teeth of the large sprocket A following the tooth A6. The chain B is lowered to the outside circumference of the small sprocket C radially inwardly in relation to the axis of the sprocket set. The hinge points B6, B7 and B8 cannot yet be engaged with their chain rollers 14 between the successive teeth of the small sprocket, as shown in FIG. 7 by the representation of the circumferential offset. A radially inward motion of the hinge point B6 is prevented because the link plate D7ag to the left in FIG. 8 of the outer link plate pair D7a is supported against the shoulder 30 (See FIG. 6), which is formed as a result of the bevel 23, and on the other hand the chain rollers 14 of the hinge points B7 and B8 can lean against the teeth C7 and C8. On the other hand, the hinge point B9 can be engaged between the successive teeth C8 and C9. The existence of the elongated tooth space ZA, together with the bevels 23 on the teeth A5 and A6, essentially promotes the diagonal position of the chain B when the guide wheel 10 moves toward the smaller sprocket, as shown in FIG. 8. The enlarged tooth space ZC, shown in FIG. 7, can also contribute to facilitating the transfer of the chain B between the large sprocket A and the small sprocket C.

Figure 9:
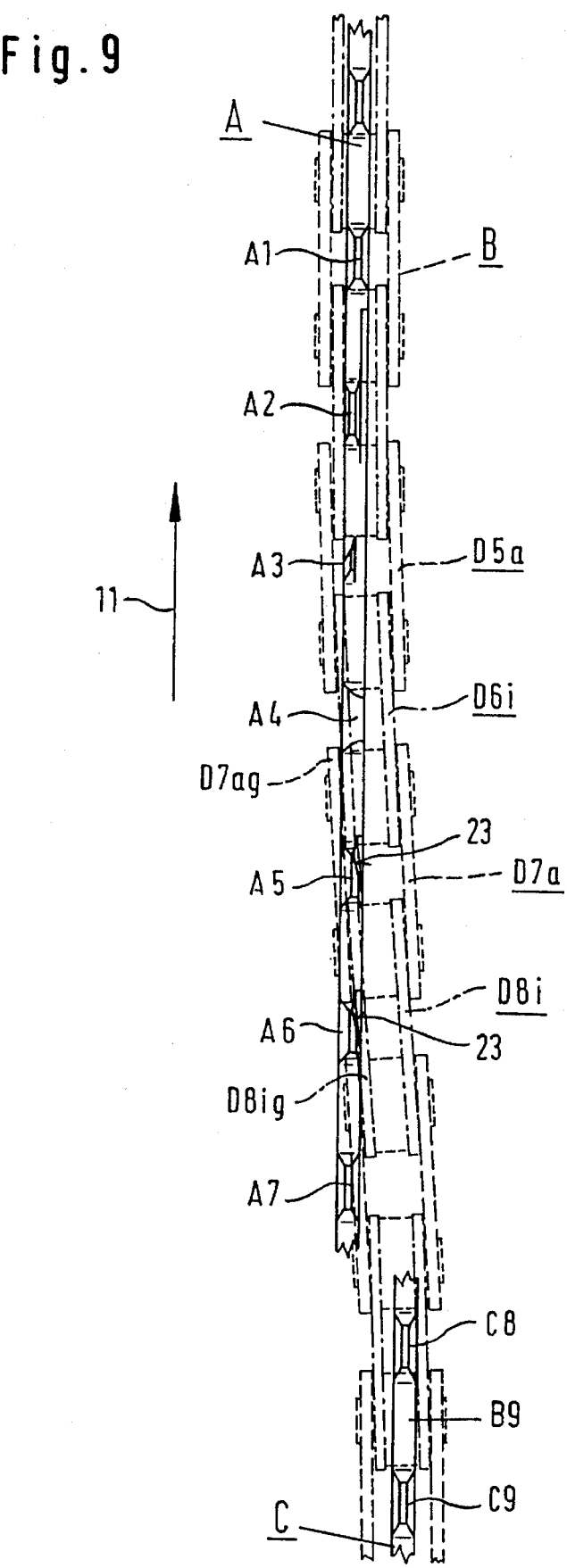
FIG. 9 shows a view as in FIG. 8, but with a different correspondence between the outer and inner chain links and the sprockets.

FIG. 9 illustrates the situation which occurs during a shifting of the chain B from the large sprocket A to the small sprocket C, an outer link plate pair D5a is located in the vicinity of the missing tooth space A3 and accordingly an inner chain link pair D6i is located in the vicinity of the tooth A4, and an outer chain link pair D7a is located in the vicinity of the tooth A5. Then, as shown in FIG. 1, at the approach position 15, the chain B, on account of its limited flexibility, essentially cannot be bent far enough out of its principal plane so that the left link plate D7ag in FIG. 9 of the outer link plate pair D7a can move to the right of the tooth A5; rather, the left link plate D7ag of the outer link plate pair D7a in FIG. 9 will pass on the left side of the tooth A5. Essentially, only the left link plate D8ig of the inner link plate pair D8i corresponding to the tooth A6 can then move past on the right side of the tooth A6 illustrated in FIG. 9. In this case, the bevel 23 of the tooth A6 then promotes the transfer of the chain from the large sprocket A to the small sprocket C. For both situations illustrated in FIGS. 7 and 8 on the one hand, and in FIG. 9 on the other hand, there is preferential shifting on a defined tooth A5 or A6 of the large sprocket A. The chain B will therefore shift with a higher probability to the small sprocket C if, after an adjustment or bias has been applied to the guide wheel 10 toward the smaller sprocket C, the tooth A5 or A6 is present in the approach area 15.

Generally, FIG. 1 shows that there can be a total of three enlarged tooth spaces ZA on the large sprocket A, and two or more enlarged tooth spaces ZC, possibly three, on the small sprocket C. This results from the above-mentioned ratio of the number of teeth 21:18, which results in a difference of three in the number of teeth.

It should be understood that, in accordance with at least one preferred embodiment of the present invention, the number of enlarged tooth spaces ZA and ZC can be chosen as deemed appropriate. Although only two enlarged tooth spaces ZC are specifically illustrated in FIG. 1, it is to be understood that three or more may conceivably be employed. Additionally, any additional tooth spaces ZC over two could conceivably be positioned intermediate to the two illustrated in FIG. 1. In the case of three tooth spaces ZC, it is conceivable to distribute the same at substantially regular intervals, i.e. at about 120° apart with respect to one another.

Therefore, with a predetermined angular orientation of the two gear wheels A and C, as shown in the Figures, three transfer regions are preferably created, for example, in which transfers are possible both from the large sprocket A to the small sprocket C, and also from the small sprocket C to the large sprocket A. In these transfer regions, there are preferably always corresponding toothing configurations of the two sprockets. The tooth ratios described above with reference to FIGS. 1 to 9 are preferably present in the vicinity of each of these enlarged tooth spaces ZA and ZC, so that the shifting can preferably take place from the small sprocket C to the large sprocket A in a total of 3 positions each, and for shifting from the large sprocket A to the small sprocket C, there is a preference at three positions. On account of the facilitated transfer of the chain B from the large sprocket A to the small sprocket C, of course it cannot be guaranteed that each time the guide wheel 10 approaches the small sprocket C, the shifting will essentially occur only in the preferred positions, as described above with reference to FIGS. 7 to 9. But there is an increased probability that the shifting will take place at these preferred positions, so that the rider will tend to find the action of shifting from the large sprocket A to the small sprocket C under load to be particularly smooth and quiet.

Figure 10:
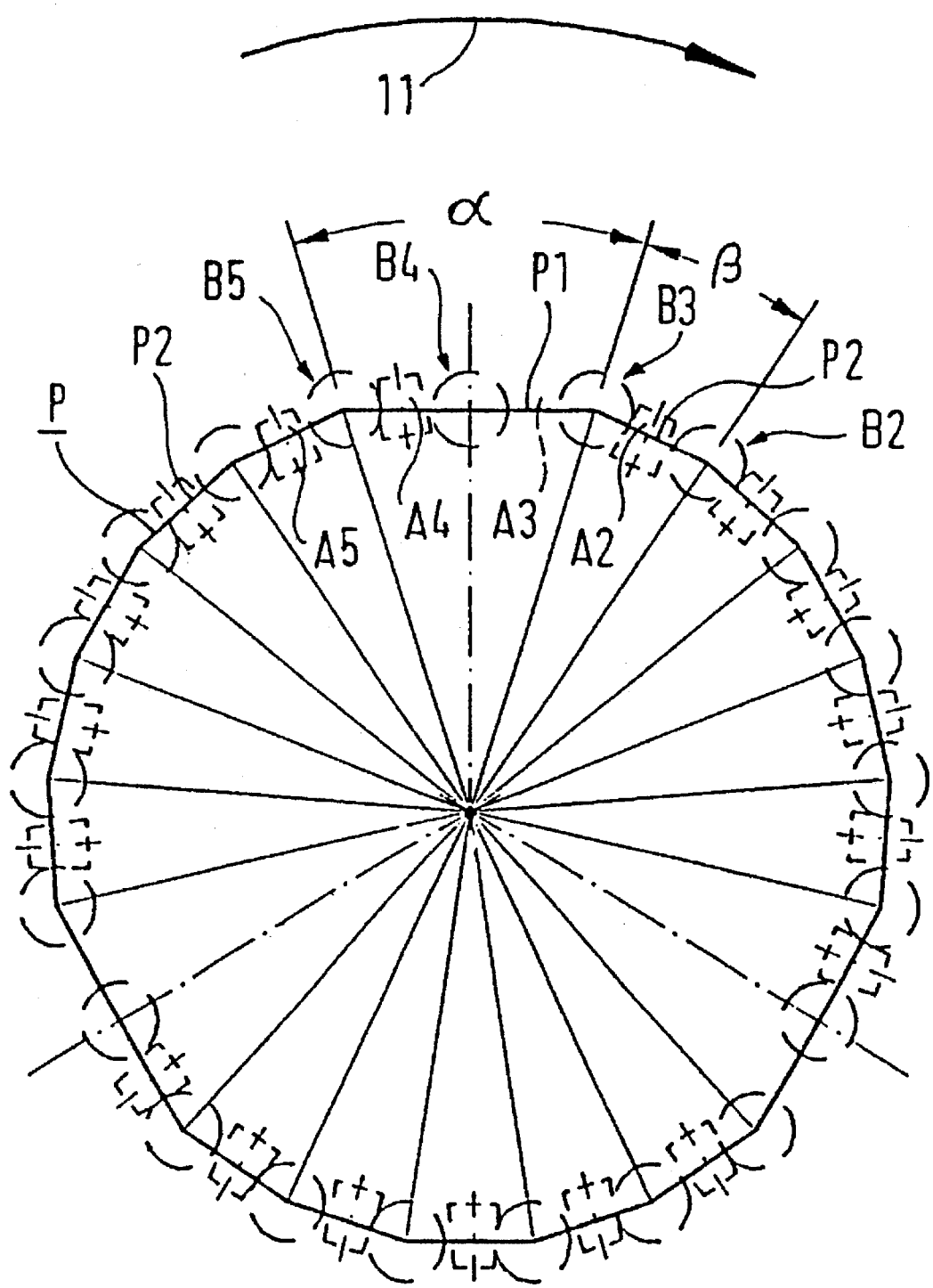
FIG. 10 is a schematic diagram of the distribution of teeth and tooth spaces on a sprocket, corresponding approximately to the larger sprocket illustrated in FIG. 1.
Figure 11:
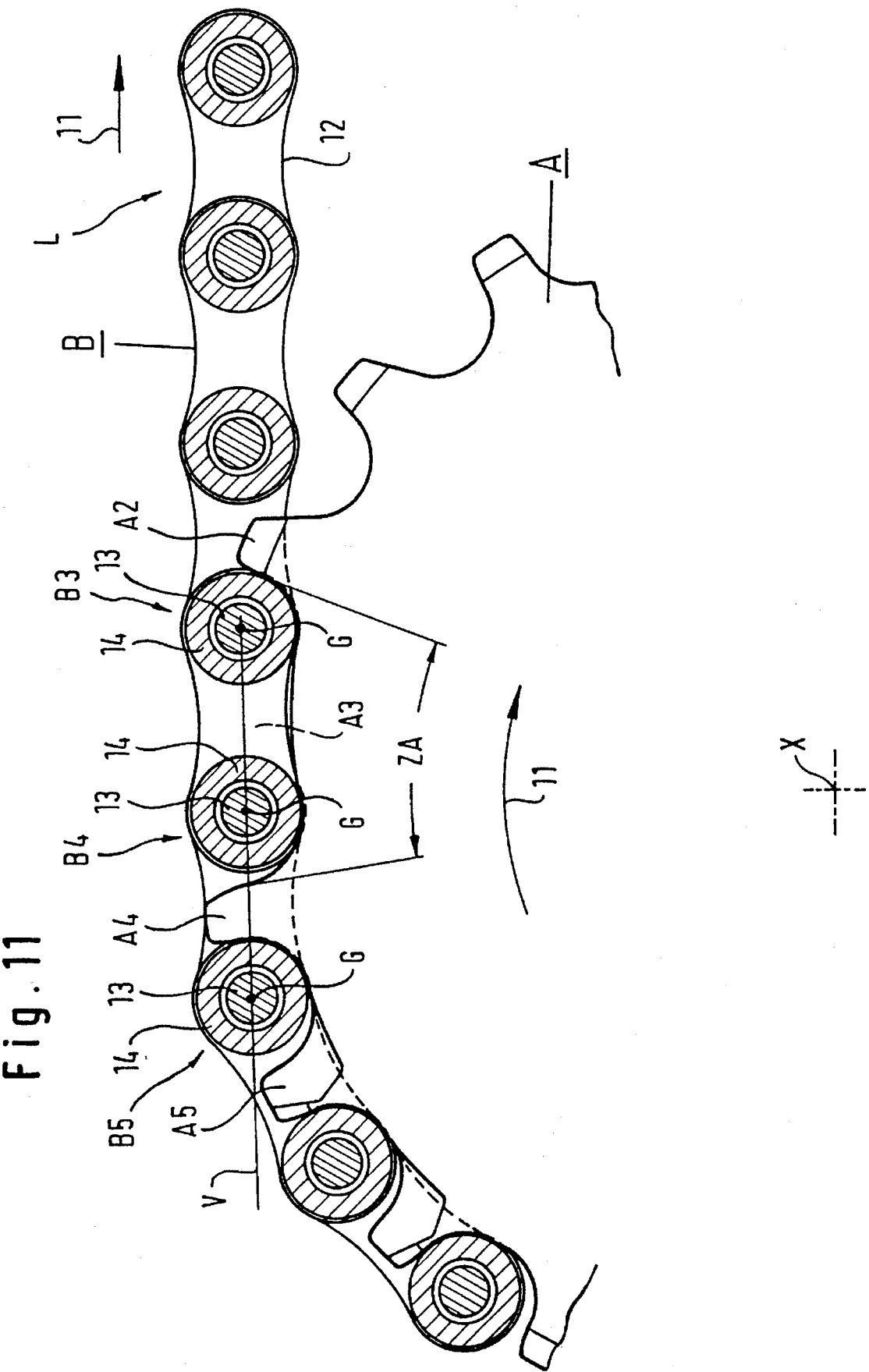
FIG. 11 shows the runout of the chain from the sprocket as illustrated in FIG. 10.

With reference to FIGS. 10 and 11, the following information should also be noted. FIG. 11 shows in particular the engagement situation between the large sprocket A and the chain B, in which the chain rollers 13 and the corresponding chain rollers 14 with their link axes G are oriented on a straight connecting line V. This essentially does not correspond to the simple omission of a tooth in the position A3 between the teeth A2 and A4; rather, the tooth space ZA is configured differently than if only the tooth A3 had been "filed away" between the teeth A2 and A4. The orientation of the link axes G of the hinge points B3, B4 and B5 on the straight connecting line V essentially means that in spite of the presence of the enlarged tooth spaces ZA in the large sprocket A (but this is also true for the small sprocket C), there are essentially always perfect engagement conditions between the chain and the tooth spaces, including the enlarged tooth spaces. In this regard, it can also be imagined that the chain segment between the hinge points B3 and B5, in spite of the intermediate hinge point B4, behaves like a single rigid chain section between the hinge points B3 and B5, which corresponds to the increased length of the tooth space ZA. This is of major importance, in particular if, as shown in FIGS. 1 and 11, the chain B runs off the sprocket set A,C in the area L, and the connecting line V lies approximately parallel to the top strand 12 of the chain which leads to a sprocket on the crankset side.

It has been determined that the configuration which is expressed in the orientation of the hinge points B3, B4 and B5 on a common connecting line tends to achieve an improved chain shifting action, both from the point of view of smoothness and quietness, and also from the point of view of the wear and tear both on the chain and on the sprockets.

The system which is illustrated on an enlarged scale in FIG. 11 is illustrated in FIG. 10 by means of the total circumference of the sprocket set. FIG. 10 shows an irregular polygon line P, within which elongated polygon sides P1 alternate with shorter polygon sides P2. The longer polygon sides P1 correspond to a central angle (alpha) and preferably extend from the hinge point B5 to the hinge point B3. The polygon side P1 thereby corresponds to the connecting line V illustrated in FIG. 11. The shorter polygon side P2 corresponds, for example, to the connection between the hinge point B2 and the hinge point B3. The teeth A2, A4, A5 and the missing tooth space A3 are also indicated schematically in FIG. 10. The design of a sprocket illustrated in FIG. 10 is complex, to the extent that the distribution of the teeth and tooth spaces over the circumferences essentially must be calculated individually each time on the basis of the polygon line P.

It is known that the polygon-like distribution of the hinge points on a sprocket leads to fluctuations in the level of torque transmitted, and therefore to changes in the torque which can be felt by the rider, even if the polygon is a regular, equilateral polygon.

In the configuration claimed by the invention of a sprocket as illustrated in FIG. 10, the possibility of such fluctuations is increased even further on account of the non-uniformity of the polygon. But it has been determined that this phenomenon is acceptable, if we consider the advantage of the reduced wear on the chain and sprocket, and the reduced level of noise generated during shifting.

The preceding explanation, which is based on two sprockets of a driven sprocket set on the rear wheel hub of a bicycle, essentially also applies for any other pairing of two neighboring sprockets, if the sprocket set has more than two such sprockets. The design of all of the sprockets must preferably be determined with regard to the number of teeth on the neighboring sprockets, and with particular regard to the ratios of the number of teeth between neighboring sprockets. Likewise, the angular adjustment between the sprockets of each pair of sprockets must be determined once and for all, so that during shifting from the small sprocket to the large sprocket, the chain length of the curved or bent chain segment B1–B5 between the hinge points B1 and B5 corresponds at least approximately to the path of this chain segment between the hinge points B1 and B5 specified by the prevailing tooth geometry. If there is a difference of more than 3 in the number of teeth, even more than the above-mentioned hinge points B1–B5 can fall in the transfer area. In addition, it is generally not essential that radially inside an enlarged tooth space ZA of the larger sprocket A, there must be an enlarged tooth space ZC of the smaller sprocket C, and in particular the forward location of the enlarged tooth space ZC of the smaller sprocket in relation to the enlarged tooth space ZA of the larger sprocket illustrated in FIG. 1 is not essential. The transfer chain segment T may be neither too loose nor too tight if, on one hand, the hinge point B1 is engaged between the teeth C1 and C2 and on the other hand, the hinge point B5 is engaged between the teeth A4 and A5. Only then is it essentially guaranteed that there will be a smooth and quite transfer of the torque transmission between the different sprockets.

It essentially goes without saying that in each sprocket, the distance between the midpoints of two chain rollers 14 which are engaged, i.e. the segment between the midpoints of chain rollers B2 and B3 corresponds approximately to the chain pitch from hinge point to hinge point. This essentially must be true for all the sprockets participating in the action.

The principles explained above on the basis of a rear hub sprocket set of a bicycle can also be applied if a derailleur on the crankset is equipped with several sprockets, and to change the translation ratio between the sprockets of the crankset derailleur.

The preceding explanation also assumed that only one tooth was omitted between two successive teeth of a sprocket. It is also possible that more than one tooth can be omitted between two successive teeth of the respective sprocket set, in which case the polygon illustrated in FIGS. 10 and 11 becomes unequal. The advantage of omitting more than one tooth between two neighboring teeth is that the "channel" for the passage of the chain B can then be even larger, so that problems caused by the deflection of the chain B from its plane of circulation can be prevented during the shifting of the chain.

As noted several times in the preceding explanation, the spur provided on the large sprocket A in the enlarged tooth space ZA essentially does not function in any way as a tooth; it is used essentially only for the lateral guidance of the chain B when the chain B is moving backward, opposite to the normal direction of circulation 11. As a rule, if the spur is present at all, it is provided essentially only in the enlarged tooth spaces of the largest sprocket or of the largest sprockets of a set of sprockets.

Figure 12:
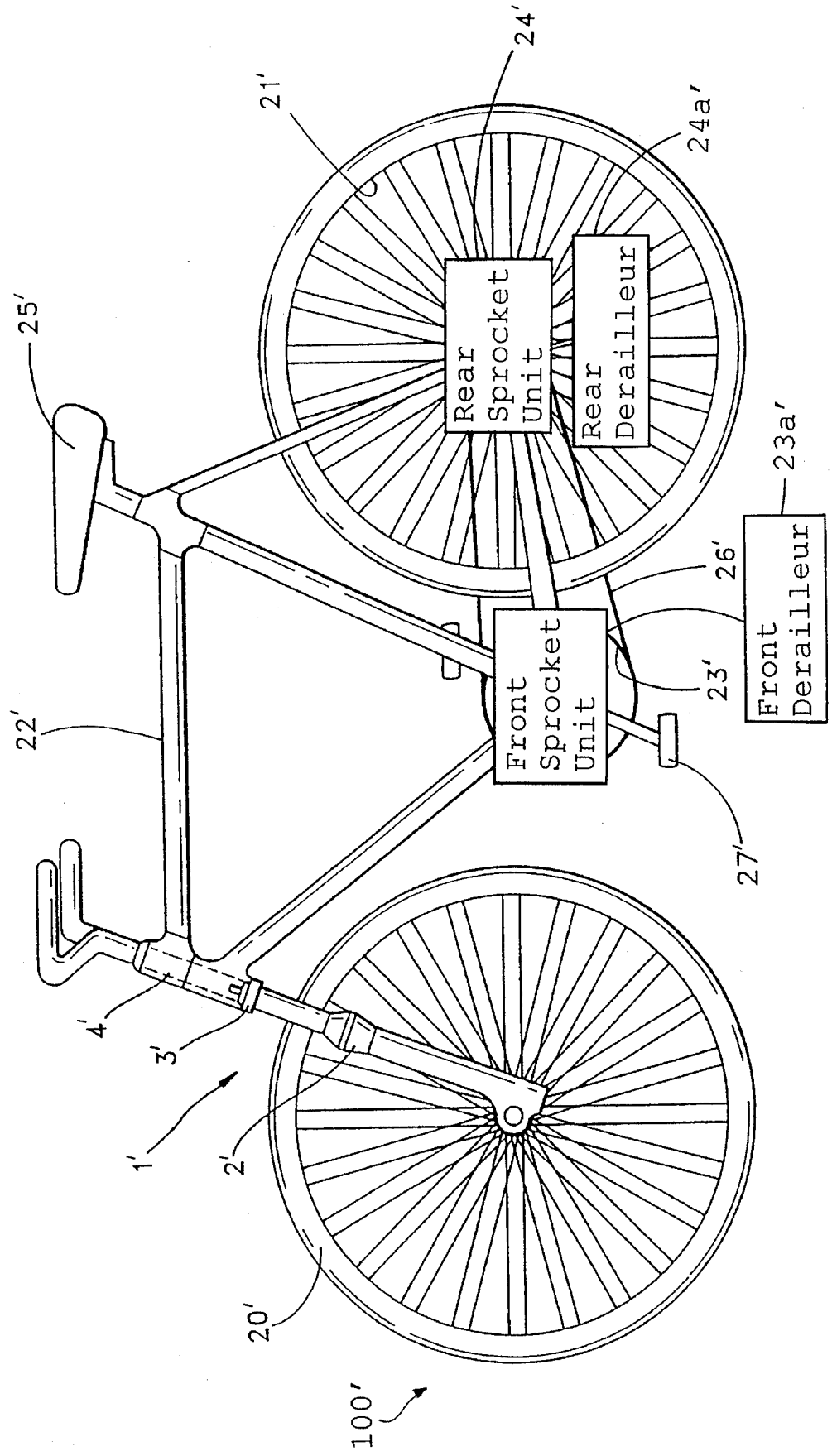
FIG. 12 illustrates a bicycle in which the present invention may be employed.

FIG. 12 shows a bicycle 100' in which the present invention may be employed. Such a bicycle 100' may typically have a front wheel 20' and a rear wheel 21'. The wheels 20', 21' may typically be attached to a frame 22'. Typically, movement of a pulley-like, chain-and-pedal system will cause the rear wheel 21' to rotate. Particularly, pedals 27' may typically be attached to the hub of a front sprocket unit 23', whereby such a front sprocket unit 23' would be configured to engage a chain 26'. Typically, when the pedals 27' are moved in a forward circular direction, chain 26' will be turned by front sprocket unit 23'. Chain 26' can typically be connected, in pulley-like fashion, to rear sprocket unit 24', which is preferably attached to rear wheel 21'. Other components typically provided are a seat 25' attached to frame 22', a front fork 1' with fork tubes 2', a steering head 3' and a handlebar stem 4' connected to steering head 3'.

A rear derailleur 24a' can typically be provided in conjunction with rear sprocket unit 24', while a front derailleur 23a' can typically be provided in conjunction with front sprocket unit 23'.

It will be understood that the components discussed above with relation to FIG. 12 may, if appropriate, essentially be considered to be interchangeable with similar components discussed further above with relation to FIGS. 1–11. For example, the guide wheel 10 discussed further above may be considered to be interchangeable with rear derailleur 24a' of FIG. 12.

One feature of the invention resides broadly in the derailleur, in particular for bicycles, comprising a driving sprocket unit and a driven sprocket unit A–C, a well as a chain B connecting these two sprocket units to one another, whereby at least one A–C of the sprocket units is designed as a multisprocket unit A–C with at least two sprockets A, C, namely a larger sprocket A and a smaller sprocket C, whereby in addition, the two sprockets A, C of the multisprocket unit A–C each have a number of teeth A1 . . . ; C1 . . . and a corresponding number of spaces A1–A2; C1–C2 formed between each pair of teeth A1,A2; C1,C2, whereby, in addition, the chain B is formed by successive chain links B1 . . . and by inner D2$i$ and outer D3$a$ link plate pairs in alternating sequence between the chain links B1 . . . , whereby in addition, to shift the chain B between the two sprockets A, C of the multisprocket unit A–C, there is a shifter 10 in an approach area 15, in which in the normal direction of circulation 11 of the chain B and of the sprockets A, C, the chain B enters the multisprocket unit A–C, and this shifter 10 is designed to impart motions to the chain B in a direction parallel to the axis X of the multisprocket unit A–C, whereby, in addition, when the chain B is shifted between the sprockets A, C of the multisprocket unit A–C, a chain transfer segment B1–B5 is formed between a sprocket C from which the chain B is being shifted to the sprocket A to which the chain B is being shifted, which chain transfer segment B1–B5 traverses the circulation area of the multisprocket unit A–C from the chain approach area 15 to a chain runout area L of the multisprocket unit A–C, whereby, in addition, the chain transfer segment B1–B5 extends opposite to the normal direction of circulation 11 of the sprocket set A, C, from a chain link B1 which is the last chain link B1 engaged between two last teeth C1, C2 of a final pair of teeth C1, C2 of the sprocket C from which the chain B is being shifted, to a chain link B5 which is the first link engaged between two first teeth A4, A5 of a first pair of teeth A4, A5 of the sprocket A to which the chain B is being shifted, and whereby in at least a chain transfer circumferential area T of the multisprocket unit A–C corresponding to the shifting of the chain from a smaller sprocket C to a larger sprocket A, design measures are applied to the sprockets A, C in this chain transfer circumferential area T to facilitate the shifting of the chain B between the two sprockets A, C at least in the shifting direction from the smaller sprocket C to a larger sprocket A, and to define the path of the corresponding chain transfer segment B1–B5, characterized by the following features:

a) in the chain transfer circumferential area T corresponding to the shifting from the smaller sprocket C to the larger sprocket A, one tooth at A3 is omitted on the larger sprocket A, forming a double tooth space ZA, which in the normal direction of circulation 11 precedes the leading first tooth A4 of the first pair of teeth A4, A5 of the larger sprocket A;

b) on the large sprocket A, on its lateral surface facing the smaller sprocket C, in the base area of a tooth A2 (which in the normal direction of rotation 911) precedes the double tooth space ZA, and if desired there is also, in the leading terminal portion of the double tooth space ZA, a link support plate 16, which in the normal direction of rotation 11 follows the trailing last tooth C2 of the last tooth pair C1, C2 of the smaller sprocket C;

c) as a result of the link support plate 16 and a base ZA1 of the double tooth space ZA, there is a path B1, B2, B3, B4, B5 of the chain transfer segment B1–B5 which is curved or bent convexly radially outwardly inside the chain transfer circumferential area T between the first pair of teeth A4, A5 of the larger sprocket A and the last pair of teeth C1, C2 of the smaller sprocket C, whereby the curved chain transfer segment B1–B5 is confluent with the tooth space C1–C2 between the last two teeth C1, C2 of the last tooth pair C1, C2 of the smaller sprocket C;

d) the leading first tooth A4 of the first tooth pair A4, A5 of the larger sprocket A in the normal direction of circulation 11 is designed for engagement both between the chain plates of an inner link plate pair D5$i$ and between the link plates of an outer link plate pair D5$a$.

Another feature of the invention resides broadly in the derailleur characterized by the fact that on the smaller sprocket C, a tooth at C3 is omitted following the trailing last tooth C2 of the last tooth pair C1, C2, forming a multiple tooth space ZC on the smaller sprocket C.

Yet another feature of the invention resides broadly in the derailleur characterized by the fact that the link support plate 16 is formed by the radially inner edge of a relief-like recess 17 in one of the lateral surfaces of the larger sprocket A facing the smaller sprocket C.

Still another feature of the invention resides broadly in the derailleur characterized by the fact that the relief-like recess 17 has a leading edge 17$a$ which runs essentially radially and which, in the normal direction of circulation 11, precedes the axis X of the multisprocket unit A–C, whereby a link plate D2$ig$ which is adjacent in the axial direction to this leading edge 17$a$ runs past this leading edge 17$a$.

A further feature of the invention resides broadly in the derailleur characterized by the fact that the relief-like repression 17 in a leading area corresponding to the normal direction of circulation 11 in front of a leading end of the link support plate 16 is extended radially inward toward the axis X of the multisprocket unit A–C.

Another feature of the invention resides broadly in the derailleur characterized by the fact that the leading first tooth A4 of the first tooth pair A4, A5 of the larger sprocket A is bevelled radially outward on its lateral surface 22 away from the smaller sprocket C and toward the smaller sprocket C.

Yet another feature of the invention resides broadly in the derailleur characterized by the fact that at least some of the teeth A1, A2, A5, A6 of the larger sprocket A, which are not identical to the leading first tooth A4 of the first tooth pair A4, A5 of the larger sprocket A, are bevelled radially outward on their side 27 facing the smaller sprocket C, and away from the smaller sprocket C, namely at least and preferably in a radially outer area 27 of their radial height.

Still another feature of the invention resides broadly in the derailleur characterized by the fact that at the position A3 of the omitted tooth of the double tooth space ZA, at least on the larger sprocket A, there is a spur 19, which if it is axially next to an inner link plate pair D4$i$ lies outside the space between this inner link plate pair D4$i$, namely on the outside of the inner link plate D4$ig$ which is farther from the smaller sprocket C, and which if it is axially next to an outside link plate pair D4$a$ projects into the space between the link plates of this outer link plate pair D4$a$.

A further feature of the invention resides broadly in the derailleur characterized by the fact that to facilitate the shifting of the chain from the larger sprocket A to the smaller sprocket C, additional design measures are provided in the chain transfer circumference area for the transfer of the chain from the smaller sprocket C to the larger sprocket A on teeth A1, A2, A4, A5, A6 of the larger sprocket A.

Another feature of the invention resides broadly in the derailleur characterized by the fact that the trailing first tooth A5 of the first tooth pair A4, A5 of the larger sprocket A and/or the first tooth A6 following this trailing first tooth A5 following the latter in the normal direction of circulation 11 of the large sprocket A has bevels 27 on the side facing the smaller sprocket C, namely so that the bevelled surfaces 27—when viewed from radially outward in the axial direction—run forward and away from the smaller sprocket C in the normal direction of circulation 11.

Yet another feature of the invention resides broadly in the derailleur characterized by the fact that both teeth, i.e. both the trailing first tooth A5 of the larger sprocket A and also the tooth A6 following it in the normal direction of circulation 11 have bevels 23, whereby a chain transfer segment B5–B9 corresponding to the shifting of the chain from the larger sprocket A to the smaller sprocket C, if its inner link plate pair D6$i$ is axially next to the trailing first tooth A5 of the larger sprocket A, is in contact with the outside of its inner link plate D6$ig$ farther from the smaller sprocket C against the bevel 23 of the trailing first tooth A5 of the first tooth pair A4, A5 of the larger sprocket A, while if an outer link plate pair D7$a$ of the chain transfer segment B5–B9 is axially next to the trailing first tooth A5 of the first tooth pair A4, A5 of the larger sprocket A, this first tooth A5 is engaged between the outer link plates of this outer link plate pair D7$a$ and then an inner link plate D8$ig$ of an inner link plate pair D8$i$ following the above-mentioned outer link plate pair D7$a$ is in contact against the bevel 23 of the tooth A6 of the larger sprocket A following the first tooth A5 of the first tooth pair A4, A5 of the larger sprocket A.

Still another feature of the invention resides broadly in the derailleur characterized by the fact that the first tooth A2 and possibly also the second tooth A1 of the teeth A1, A2 preceding the enlarged tooth space of the larger sprocket A is inclined, axially offset or bevelled radially outward to coordinate with the inclined position of the chain B which already starts there in relation to its plane of circulation.

A further feature of the invention resides broadly in the derailleur characterized by the fact that the two sprockets, i.e. the larger sprocket A and the smaller sprocket C, are part of a larger group of sprocket wheels of the multisprocket unit A–C, in which case either the sprocket A heretofore regarded as the larger sprocket becomes the smaller sprocket in relation to an even larger sprocket adjacent to it, and/or the sprocket C heretofore regarded as the smaller sprocket becomes the larger sprocket in relation to an even smaller sprocket, and whereby the relationships indicated in the preceding claims 1–12 apply for at least some of the neighboring sprockets forming a pair of sprockets.

Another feature of the invention resides broadly in the derailleur characterized by the fact that there is a spur 19 only in the vicinity of the double tooth space of the largest sprocket A or of the largest sprockets of a multisprocket unit.

Yet another feature of the invention resides broadly in the derailleur characterized by the fact that corresponding to a sprocket pair A, C of a multisprocket unit A–C, there are a number of chain transfer circumferential areas T distributed over the circumference.

Still another feature of the invention resides broadly in the derailleur, in particular for bicycles, comprising a driving sprocket unit and a driven sprocket unit A–C, a well as a chain B connecting these two sprocket units to one another, whereby at least one A–C of the sprocket units is designed as a multisprocket unit A–C with at least two sprockets A, C, namely a larger sprocket A and a smaller sprocket C, whereby in addition, the two sprockets A, C of the multisprocket unit A–C each have a number of teeth A1 . . . ; C1 . . . and a corresponding number of spaces A1–A2; C1–C2 formed between each pair of teeth A1,A2; C1,C2, whereby, in addition, the chain B is formed by successive chain links B1 . . . and by inner D2$i$ and outer D3$a$ link plate pairs in alternating sequence between the chain links B1 . . . , whereby, in addition, to shift the chain B between the two sprockets A, C of the multisprocket unit A–C, there is a shifter 10 in an approach area 15, in which in the normal direction of circulation 11 of the chain B and of the sprockets A, C, the chain B enters the multisprocket unit A–C, and this shifter 10 is designed to impart movements to the chain B in a direction parallel to the axis X of the multisprocket unit A–C, whereby in addition, when the chain B is shifted between the sprockets A, C of the multisprocket unit A–C, a chain transfer segment B1–B5 is formed between a sprocket C from which the chain B is being shifted to the sprocket A to which the chain B is being shifted, which chain transfer segment B1–B5 traverses the circulation area of the multisprocket unit A–C from the chain approach area 15 to a chain runout area L of the multisprocket unit A–C, whereby, in addition, the chain transfer segment B1–B5 extends opposite to the normal direction of circulation 11 of the chain B, from a chain link B1 which is the last chain link B1 engaged between two last teeth C1, C2 of a final pair of teeth C1, C2 of the sprocket C from which the chain B is being shifted, to a chain link B5 which is the first link engaged between two first teeth A4, A5 of a first pair of teeth A4, A5 of the sprocket A to which the chain B is being shifted, and whereby in at least a chain transfer circumferential area T of the multisprocket unit A–C corresponding to the shifting of the chain from a smaller sprocket C to a larger sprocket A, design measures are applied to the sprockets A, C in this chain transfer circumferential area T to facilitate the shifting of the chain B between the two sprockets A, C at least in the shifting direction from the smaller sprocket C to a larger sprocket A, and to define the path of the corresponding chain transfer segment B1–B5, characterized by the fact that with the omission of at least one tooth at A3 between two successive teeth A2, A4 of a sprocket A and the resulting formation of a multiple tooth space, in particular a double tooth space ZA, the tooth space contour of the tooth space of this multiple tooth space ZA and the tooth space contour of a tooth space A4–A5 immediately following this multiple tooth space ZA are coordinated with one another so that when a corresponding number of chain links B3–B5 are present in these tooth spaces ZA, A4–A5, their link axes lie on a common straight connecting line V, whereby the leading chain link B3 in the multiple tooth space ZA and the chain link B5 located in the following tooth space A4, A5 are in at least proportional torque-transmitting contact during the runout into the tension strand jointly on the trailing edge of the tooth A2 or A4 preceding them, and during the winding of the tension strand of the chain onto the chainwheel of a driving sprocket set, are jointly in contact to transmit torque to the trailing flank of the tooth preceding them.

A further feature of the invention resides broadly in the derailleur characterized by the fact that the midpoints of the tooth spaces of the sprocket form an irregular polygon, whereby the link axes lying on a joint connecting line V form larger polygon sides G–G–G respectively.

Examples of bicycles, in which the embodiments of the present invention may be employed, may be found in the following U.S. Pat: No. 5,324,059, which issued to Bryne on Jun. 28, 1994; No. 5,312,125 which issued to Tse-acu-a-o-shu on May 17, 1994; No. 5,242,182, which issued to Bezerra et al. on Sep. 7, 1993; and No. 5,240,268, which issued to Allsop et al. on Aug. 31, 1993.

Examples of derailleurs, which may be utilized in accordance with the embodiments of the present invention, may be found in the following U.S. Pat: No. 4,439,171, which issued to Bergles on Mar. 27, 1984; No. 4,231,264, which issued to Bergles on Nov. 4, 1980; No. 4,183,255, which issued to Leiter on Jan. 15, 1980; and No. 3,927,904, which issued to Bergles on Dec. 23, 1975.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 43 30 989.5, filed on Sep. 13, 1993, having inventors Andreas Neuer and Jörg Bodmer, and DE-OS P 43 30 989.5 and DE-PS P 43 30 989.5, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. Sprocket arrangement for a manually powered vehicle, such a vehicle having at least one wheel, at least one wheel hub mounted on the at least one wheel, and a chain for providing a torsional force to be transferred to the at least one wheel hub, said sprocket arrangement comprising:

a first sprocket;

said first sprocket having:
  means for connecting with a wheel hub of the manually powered vehicle;
  means for receiving a torsional force from the chain and transferring the torsional force to the hub;

a second sprocket;

said second sprocket having:
  means for connecting with a wheel hub of the manually powered vehicle;
  means for receiving a torsional force from the chain and transferring the torsional force to the hub;

said first sprocket and said second sprocket having a common axis of rotation;

said first sprocket and said second sprocket each having a plane of rotation;

means for transferring the chain between said first sprocket and said second sprocket;

said chain transfer means comprising means for selectively imparting a displacement to the chain in either of a first direction and a second direction, the second direction being substantially opposite the first direction, the first and second directions being generally perpendicular to the plane of rotation of each of said first sprocket and said second sprocket;

means for facilitating transfer of the chain between said first sprocket and said second sprocket;

said means for facilitating transfer comprising:
  recess means disposed in at least one of said first sprocket and said second sprocket, said recess means having means for accommodating and supporting a portion of the chain during transfer of the chain between said first sprocket and said second sprocket and for guiding the chain, during transfer, between said first sprocket and said second sprocket;
  said recess having a surface having a portion extending substantially at a right angle with respect to the planes of rotation of said first sprocket and said second sprocket;

the chain includes a chain transfer segment when the chain is being carried by at least one of said first sprocket and said second sprocket, the chain transfer segment extending between the one of said first sprocket and said sprocket from which the chain is being transferred and the one of said first sprocket and said second sprocket to which the chain is being transferred, and further wherein:

said recess means comprises means for defining the path of the corresponding chain transfer segment;

said first sprocket comprises a plurality of teeth;

said second sprocket comprises a plurality of teeth;

said plurality of teeth of said first sprocket and said second sprocket comprising said means for receiving a torsional force;

one of said first sprocket and said second sprocket is a larger sprocket, and the other of said first sprocket and said second sprocket is a smaller sprocket, said larger sprocket having a greater diameter than said smaller sprocket;

said larger sprocket and said smaller sprocket being disposed adjacent one another and being coaxial with respect to one another;

said larger sprocket and said smaller sprocket comprising at least a portion of a multisprocket unit;

said recess means comprising a link support plate which, in the normal direction of rotation of said multisprocket unit, follows the trailing last tooth of the last tooth pair of the smaller sprocket; and said link support plate comprising means for accommodating and supporting a portion of the chain as the chain is being transferred between one of said first sprocket and said second sprocket and the other of said first sprocket and said second sprocket.

2. The sprocket arrangement according to claim 1, wherein:

said larger sprocket has a plurality of lateral surfaces, at least one of said lateral surfaces facing said smaller sprocket;

the link support plate comprises a relief-like recess, said the relief-like recess having a radially inner edge, the relief-like recess being recessed into one of said at least one lateral surface of the larger sprocket facing the smaller sprocket; and the link support plate is formed by the radially inner edge of the relief-like recess.

3. The sprocket arrangement according to claim 2, wherein said means for facilitating transfer further comprises:

channel means for accommodating the chain as the chain is being transferred between said first sprocket and said second sprocket;

said channel means being defined by said plurality of teeth of at least one of said first sprocket and said second sprocket;

said channel means being oriented at a skew with respect to the planes of rotation of said first sprocket and said second sprocket;

said plurality of teeth of at least one of said first sprocket and said second sprocket forming said channel means as a substantially straight path for permitting a substantially straight transfer of the chain, with respect to the planes of rotation of said first sprocket and said second sprocket, between said first sprocket and said second sprocket.

4. The sprocket arrangement according to claim 3, wherein:

at least one tooth is omitted between two successive teeth of one of said first and second sprockets to thereby form a multiple-tooth space in the form of a double-tooth space;

the tooth space contour of the tooth space of this multiple tooth space and the tooth space contour of a tooth space immediately following this multiple tooth space are coordinated with one another so that when a corresponding number of chain links are present in these tooth spaces, their link axes lie on a common straight connecting line, whereby the leading chain link in the multiple tooth space and the chain link located in the following tooth space are in at least proportional torque-transmitting contact during the runout into the tension strand jointly on the trailing edge of the tooth or preceding them, and during the winding of the tension strand of the chain onto the chainwheel of a driving sprocket set, are jointly in contact to transmit torque to the trailing flank of the tooth preceding them.

5. The sprocket arrangement according to claim 4, wherein said sprocket arrangement is configured such that:

said first sprocket and said second sprocket comprise a portion of a multisprocket unit, said multisprocket unit being one of:

a driving sprocket unit for driving the chain of the manually powered vehicle; and a driven sprocket unit for being driven by the chain of the manually powered vehicle;

the manually powered vehicle having two wheels;

the chain is for connecting the driving sprocket unit and the driven sprocket unit with one another;

the chain comprises a plurality of chain links, each of the chain links comprising a pair of link plates disposed in parallel with respect to one another;

the plurality of chain links comprise:

first pairs of link plates being outer pairs of link plates;

second pairs of link plates being inner pairs of link plates;

each link plate of each first pair of link plates being connected to a corresponding link plate of each neighboring second pair of link plates;

each link plate of each second pair of link plates being disposed between, and flanked by, the link plates of each neighboring first pair of link plates;

the first and second pairs of link plates alternating with each other along the chain;

said chain transfer means comprises:

means for shifting the chain between said first and second sprocket;

said shifting means being disposed in an approach area, in which the chain approaches said multisprocket unit;

the chain transfer segment is for being disposed in a region, with respect to said first and second sprocket, between the approach area and a chain runout area, the chain runout area being that area in which the chain leaves said first sprocket and said second sprocket;

the chain transfer segment is for extending opposite to the normal direction of circulation of said multisprocket unit from a chain link which is the last chain link engaged between two last teeth of a final pair of teeth of the one of said first and second sprocket from which the chain is being shifted to a chain link which is the first link engaged between two first teeth of a first pair of teeth of the one of said first and second sprocket to which the the chain is being shifted;

said channel means comprising:

one tooth being omitted on one of said first and second sprocket, forming a double-tooth space which, in the normal direction of circulation of said multisprocket unit, precedes the leading first tooth of the first pair of teeth of the larger sprocket;

said double-tooth space comprising a base;

said link support plate of said recess means and said base of said double-tooth space combining to form a path of the chain transfer segment which is curved or bent convexly radially outwardly inside the chain transfer circumferential area between the first pair of teeth of the larger sprocket and the last pair of teeth of the smaller sprocket, whereby the curved chain transfer segment is confluent with the tooth space between the last two teeth of the last tooth pair of the smaller sprocket;

the leading first tooth of the first tooth pair of the larger sprocket in the normal direction of circulation of said multisprocket unit is designed for engagement both between the chain plates of an inner link plate pair and between the link plates of an outer link plate pair;

on the smaller sprocket, a tooth is omitted following the trailing last tooth of the last tooth pair forming a multiple tooth space on the smaller sprocket;

the relief-like recess has a leading edge which runs essentially radially and which, in the normal direction of circulation, precedes the axis of the multisprocket unit, whereby a link plate which is adjacent in the axial direction to this leading edge runs past this leading edge;

the relief-like recess in a leading area corresponding to the normal direction of circulation in front of a leading end of the link support plate is extended radially inward toward the axis of the multisprocket unit;

the leading first tooth of the first tooth pair of the larger sprocket is bevelled radially outward on its lateral surface away from the smaller sprocket and toward the smaller sprocket;

to facilitate the shifting of the chain from the larger sprocket to the smaller sprocket, additional design measures are provided in the chain transfer circumference area for the transfer of the chain from the smaller sprocket to the larger sprocket on teeth of the larger sprocket;

the trailing first tooth of the first tooth pair of the larger sprocket and/or the first tooth following this trailing first tooth following the latter in the normal direction of circulation of the large sprocket has bevels on the side facing the smaller sprocket, namely so that the bevelled surfaces, when viewed from radially outward in the axial direction, run forward and away from the smaller sprocket in the normal direction of circulation;

both the trailing first tooth of the larger sprocket and also the tooth following it in the normal direction of circulation have bevels, whereby a chain transfer segment corresponding to the shifting of the chain from the larger sprocket to the smaller sprocket, if its inner link plate pair is axially next to the trailing first tooth of the larger sprocket, is in contact with the outside of its inner link plate farther from the smaller sprocket against the bevel of the trailing first tooth of the first tooth pair of the larger sprocket, while if an outer link plate pair of the chain transfer segment is axially next to the trailing first tooth of the first tooth pair of the larger sprocket, this first tooth is engaged between the outer link plates of this outer link plate pair and then an inner link plate of an inner link plate pair following the above-mentioned outer link plate pair is in contact against the bevel of the tooth of the larger sprocket following the first tooth of the first tooth pair of the larger sprocket;

that first tooth and the second tooth of the teeth preceding the enlarged tooth space of the larger sprocket are inclined, axially offset or bevelled radially outward to coordinate with the inclined position of the chain which already starts there in relation to its plane of circulation;

the larger sprocket and the smaller sprocket are part of a larger group of sprocket wheels of the multisprocket unit, in which case either the sprocket heretofore regarded as the larger sprocket becomes the smaller sprocket in relation to an even larger sprocket adjacent to it, and/or the sprocket heretofore regarded as the smaller sprocket becomes the larger sprocket in relation to an even smaller sprocket, and whereby the features recited heretofore with relation to the pair of sprockets constituted by the aforementioned larger sprocket and the aforementioned smaller sprocket, are present for at least one neighboring pair of sprockets other than the pair of sprockets constituted by the aforementioned larger sprocket and aforementioned smaller sprocket;

corresponding to a sprocket pair of a multisprocket unit, there are a number of chain transfer circumferential areas distributed over the circumference, in which the characteristics relating to chain transfer areas recited heretofore apply to each of said number of chain transfer circumferential areas; and the midpoints of the tooth spaces of the sprocket form an irregular polygon, whereby the link axes lying on a joint connecting line form larger polygon sides G–G–G.

6. The sprocket arrangement according to claim 2, wherein:

a plurality of teeth of said first sprocket and said second sprocket comprise means for receiving a full torsional force from the chain and transferring the full torsional force to the at least one wheel hub; and said means for facilitating transfer further comprises:
  means for locally substantially reducing on:
    at least one of said first sprocket and said second sprocket, and
    the chain,
  the transfer of the full torsional force between:
    at least one of said first sprocket and said second sprocket, and
    the chain;
  said means for locally substantially reducing the transfer of full torsional force being disposed between two teeth of said plurality of teeth for transferring full torsional force.

7. The sprocket arrangement according to claim 6, wherein:

at least one tooth is omitted between two successive teeth of one of said first and second sprockets to thereby form a multiple-tooth space in the form of a double-tooth space;

the tooth space contour of the tooth space of this multiple tooth space and the tooth space contour of a tooth space immediately following this multiple tooth space are coordinated with one another so that when a corresponding number of chain links are present in these tooth spaces, their link axes lie on a common straight connecting line, whereby the leading chain link in the multiple tooth space and the chain link located in the following tooth space are in at least proportional torque-transmitting contact during the runout into the tension strand jointly on the trailing edge of the tooth or preceding them, and during the winding of the tension strand of the chain onto the chainwheel of a driving sprocket set, are jointly in contact to transmit torque to the trailing flank of the tooth preceding them.

8. The sprocket arrangement according to claim 7, wherein said sprocket arrangement is configured such that:

said first sprocket and said second sprocket comprise a portion of a multisprocket unit, said multisprocket unit being one of:

a driving sprocket unit for driving the chain of the manually powered vehicle; and a driven sprocket unit for being driven by the chain of the manually powered vehicle;

the manually powered vehicle having two wheels;

the chain is for connecting the driving sprocket unit and the driven sprocket unit with one another;

the chain comprises a plurality of chain links, each of the chain links comprising a pair of link plates disposed in parallel with respect to one another;

the plurality of chain links comprise:
first pairs of link plates being outer pairs of link plates;
second pairs of link plates being inner pairs of link plates;
each link plate of each first pair of link plates being connected to a corresponding link plate of each neighboring second pair of link plates;
each link plate of each second pair of link plates being disposed between, and flanked by, the link plates of each neighboring first pair of link plates;
the first and second pairs of link plates alternating with each other along the chain;

said chain transfer means comprises:
means for shifting the chain between said first and second sprocket;
said shifting means being disposed in an approach area, in which the chain approaches said multisprocket unit;

the chain transfer segment is for being disposed in a region, with respect to said first and second sprocket, between the approach area and a chain runout area, the chain runout area being that area in which the chain leaves said first sprocket and said second sprocket;

the chain transfer segment is for extending opposite to the normal direction of circulation of said multisprocket unit from a chain link which is the last chain link engaged between two last teeth of a final pair of teeth of the one of said first and second sprocket from which the chain is being shifted to a chain link which is the first link engaged between two first teeth of a first pair of teeth of the one of said first and second sprocket to which the the chain is being shifted;

the relief-like recess has a leading edge which runs essentially radially and which, in the normal direction of circulation, precedes the axis of the multisprocket unit, whereby a link plate which is adjacent in the axial direction to this leading edge runs past this leading edge;

the relief-like recess in a leading area corresponding to the normal direction of circulation in front of a leading end of the link support plate is extended radially inward toward the axis of the multisprocket unit;

the leading first tooth of the first tooth pair of the larger sprocket is bevelled radially outward on its lateral surface away from the smaller sprocket and toward the smaller sprocket;

at least some of the teeth of the larger sprocket, which are not identical to the leading first tooth of the first tooth pair of the larger sprocket, are bevelled radially outward on their side facing the smaller sprocket, and away from the smaller sprocket, namely in a radially outer area of their radial height;

at the position of the omitted tooth of the double tooth space, at least on the larger sprocket, there is a spur, which if it is axially next to an inner link plate pair lies outside the space between this inner link plate pair, namely on the outside of the inner link plate which is farther from the smaller sprocket, and which if it is axially next to an outside link plate pair projects into the space between the link plates of this outer link plate pair;

to facilitate the shifting of the chain from the larger sprocket to the smaller sprocket, additional design measures are provided in the chain transfer circumference area for the transfer of the chain from the smaller sprocket to the larger sprocket on teeth of the larger sprocket;

the trailing first tooth of the first tooth pair of the larger sprocket and/or the first tooth following this trailing first tooth following the latter in the normal direction of circulation of the large sprocket has bevels on the side facing the smaller sprocket, namely so that the bevelled surfaces, when viewed from radially outward in the axial direction, run forward and away from the smaller sprocket in the normal direction of circulation;

both the trailing first tooth of the larger sprocket and also the tooth following it in the normal direction of circulation have bevels, whereby a chain transfer segment corresponding to the shifting of the chain from the larger sprocket to the smaller sprocket, if its inner link plate pair is axially next to the trailing first tooth of the larger sprocket, is in contact with the outside of its inner link plate farther from the smaller sprocket against the bevel of the trailing first tooth of the first tooth pair of the larger sprocket, while if an outer link plate pair of the chain transfer segment is axially next to the trailing first tooth of the first tooth pair of the larger sprocket, this first tooth is engaged between the outer link plates of this outer link plate pair and then an inner link plate of an inner link plate pair following the above-mentioned outer link plate pair is in contact against the bevel of the tooth of the larger sprocket following the first tooth of the first tooth pair of the larger sprocket;

that first tooth and the second tooth of the teeth preceding the enlarged tooth space of the larger sprocket are inclined, axially offset or bevelled radially outward to coordinate with the inclined position of the chain which already starts there in relation to its plane of circulation;

the larger sprocket and the smaller sprocket are part of a larger group of sprocket wheels of the multisprocket unit, in which case either the sprocket heretofore regarded as the larger sprocket becomes the smaller sprocket in relation to an even larger sprocket adjacent to it, and/or the sprocket heretofore regarded as the smaller sprocket becomes the larger sprocket in relation to an even smaller sprocket, and whereby the features recited heretofore with relation to the pair of sprockets constituted by the aforementioned larger sprocket and the aforementioned smaller sprocket, are present for at least one neighboring pair of sprockets other than the pair of sprockets constituted by the aforementioned larger sprocket and aforementioned smaller sprocket;

there is a spur only in the vicinity of the double tooth space of the largest sprocket or of the largest sprockets of a multisprocket unit;

corresponding to a sprocket pair of a multisprocket unit, there are a number of chain transfer circumferential areas distributed over the circumference, in which the characteristics relating to chain transfer areas recited heretofore apply to each of said number of chain transfer circumferential areas; and the midpoints of the tooth spaces of the sprocket form an irregular polygon, whereby the link axes lying on a joint connecting line form larger polygon sides G–G–G.

9. Sprocket arrangement for a manually powered vehicle, such a vehicle having at least one wheel, at least one wheel hub mounted on the at least one wheel, and a chain for providing a torsional force to be transferred to the at least one wheel hub, said sprocket arrangement comprising:

a first sprocket;

said first sprocket having:
 means for connecting with a wheel hub of the manually powered vehicle;
 means for receiving a torsional force from the chain and transferring the torsional force to the hub;

a second sprocket;

said second sprocket having:
 means for connecting with a wheel hub of the manually powered vehicle;
 means for receiving a torsional force from the chain and transferring the torsional force to the hub;

said first sprocket and said second sprocket having a common axis of rotation;

said first sprocket and said second sprocket comprising at least a portion of a multisprocket unit;

said first sprocket and said second sprocket each having a plane of rotation;

means for transferring the chain between said first sprocket and said second sprocket;

said chain transfer means comprising means for selectively imparting a displacement to the chain in either of a first direction and a second direction, the second direction being substantially opposite the first direction, the first and second directions being generally perpendicular to the plane of rotation of each of said first sprocket and said second sprocket;

said first sprocket comprising a plurality of teeth;

said second sprocket comprising a plurality of teeth;

said plurality of teeth of said first sprocket and said second sprocket comprising said means for receiving a torsional force;

means for facilitating transfer of the chain between said first sprocket and said second sprocket;

said means for facilitating transfer comprising:
 channel means for accommodating the chain as the chain is being transferred between said first sprocket and said second sprocket;
 said channel means being defined by said plurality of teeth of at least one of said first sprocket and said second sprocket;
 said channel means being oriented at a skew with respect to the planes of rotation of said first sprocket and said second sprocket;
 said plurality of teeth of at least one of said first sprocket and said second sprocket forming said channel means as a substantially straight path for permitting a substantially straight transfer of the chain, with respect to the planes of rotation of said first sprocket and said second sprocket, between said first sprocket and said second sprocket; and
 said channel means comprises one tooth being omitted on one of said first and second sprocket, forming a double-tooth space which, in the normal direction of circulation of said multisprocket unit, precedes the leading first tooth of the first pair of teeth of the larger sprocket.

10. The sprocket arrangement according to claim 9, wherein, on the smaller sprocket, a tooth is omitted following the trailing last tooth of the last tooth pair forming a multiple tooth space on the smaller sprocket.

11. The sprocket arrangement according to claim 10, wherein said means for facilitating transfer further comprises:

recess means disposed in at least one of said first sprocket and said second sprocket, said recess means having means for accommodating and supporting a portion of the chain during transfer of the chain between said first sprocket and said second sprocket and for guiding the chain, during transfer, between said first sprocket and said second sprocket; and said recess has a surface having a portion extending substantially at a right angle with respect to the planes of rotation of said first sprocket and said second sprocket.

12. The sprocket arrangement according to claim 11, wherein the chain includes a chain transfer segment when the chain is being carried by at least one of said first sprocket and said second sprocket, the chain transfer segment extending between the one of said first sprocket and said sprocket from which the chain is being transferred and the one of said first sprocket and said second sprocket to which the chain is being transferred; the chain comprises a plurality of chain links, each of the chain links comprising a pair of link plates disposed in parallel with respect to one another; the plurality of chain links comprise: first pairs of link plates being outer pairs of link plates, second pairs of link plates being inner pairs of link plates, each link plate of each first pair of link plates being connected to a corresponding link plate of each neighboring second pair of link plates, each link plate of each second pair of link plates being disposed between, and flanked by, the link plates of each neighboring first pair of link plates, the first and second pairs of link plates alternating with each other along the chain, and further wherein:

said recess means comprises means for defining the path of the corresponding chain transfer segment;

said recess means comprising a link support plate which, in the normal direction of rotation of said multisprocket unit, follows the trailing last tooth of the last tooth pair of the smaller sprocket;

said link support plate comprising means for accommodating and supporting a portion of the chain as the chain is being transferred between one of said first and second sprocket and the other;

said double-tooth space comprises a base;

said link support plate of said recess means and said base of said double-tooth space combining to form a path of the chain transfer segment which is curved or bent convexly radially outwardly inside the chain transfer circumferential area between the first pair of teeth of the larger sprocket and the last pair of teeth of the smaller sprocket, whereby the curved chain transfer segment is confluent with the tooth space between the last two teeth of the last tooth pair of the smaller sprocket; and the leading first tooth of the first tooth pair of the larger sprocket in the normal direction of circulation of said multisprocket unit is designed for engagement both between the chain plates of an inner link plate pair and between the link plates of an outer link plate pair.

13. The sprocket arrangement according to claim 12, wherein said sprocket arrangement is configured such that:

said larger sprocket has a plurality of lateral surfaces, at least one of said lateral surfaces facing said smaller sprocket;

the link support plate comprises a relief-like recess, said the relief-like recess having a radially inner edge, the relief-like recess being recessed into one of said at least one lateral surface of the larger sprocket facing the smaller sprocket;

the link support plate is formed by the radially inner edge of the relief-like recess;

at least one tooth is omitted between two successive teeth of one of said first and second sprockets to thereby form a multiple-tooth space in the form of a double-tooth space;

the tooth space contour of the tooth space of this multiple tooth space and the tooth space contour of a tooth space immediately following this multiple tooth space are coordinated with one another so that when a corresponding number of chain links are present in these tooth spaces, their link axes lie on a common straight connecting line, whereby the leading chain link in the multiple tooth space and the chain link located in the following tooth space are in at least proportional torque-transmitting contact during the runout into the tension strand jointly on the trailing edge of the tooth or preceding them, and during the winding of the tension strand of the chain onto the chainwheel of a driving sprocket set, are jointly in contact to transmit torque to the trailing flank of the tooth preceding them;

said first sprocket and said second sprocket comprise a portion of a multisprocket unit, said multisprocket unit being one of:
  a driving sprocket unit for driving the chain of the manually powered vehicle; and
  a driven sprocket unit for being driven by the chain of the manually powered vehicle;

the manually powered vehicle having two wheels;

the chain is for connecting the driving sprocket unit and the driven sprocket unit with one another;

said chain transfer means comprising:
  means for shifting the chain between said first and second sprocket;
  said shifting means being disposed in an approach area, in which the chain approaches said multisprocket unit;

the chain transfer segment is for being disposed in a region, with respect to said first and second sprocket, between the approach area and a chain runout area, the chain runout area being that area in which the chain leaves said multisprocket unit;

the chain transfer segment is for extending opposite to the normal direction of circulation of said multisprocket unit from a chain link which is the last chain link engaged between two last teeth of a final pair of teeth of the one of said first and second sprocket from which the chain is being shifted to a chain link which is the first link engaged between two first teeth of a first pair of teeth of the one of said first and second sprocket to which the the chain is being shifted;

the relief-like recess has a leading edge which runs essentially radially and which, in the normal direction of circulation, precedes the axis of the multisprocket unit, whereby a link plate which is adjacent in the axial direction to this leading edge runs past this leading edge;

the relief-like recess in a leading area corresponding to the normal direction of circulation in front of a leading end of the link support plate is extended radially inward toward the axis of the multisprocket unit;

the leading first tooth of the first tooth pair of the larger sprocket is bevelled radially outward on its lateral surface away from the smaller sprocket and toward the smaller sprocket;

to facilitate the shifting of the chain from the larger sprocket to the smaller sprocket, additional design measures are provided in the chain transfer circumference area for the transfer of the chain from the smaller sprocket to the larger sprocket on teeth of the larger sprocket;

the trailing first tooth of the first tooth pair of the larger sprocket and/or the first tooth following this trailing first tooth following the latter in the normal direction of circulation of the large sprocket has bevels on the side facing the smaller sprocket, namely so that the bevelled surfaces, when viewed from radially outward in the axial direction, run forward and away from the smaller sprocket in the normal direction of circulation;

both the trailing first tooth of the larger sprocket and also the tooth following it in the normal direction of circulation have bevels, whereby a chain transfer segment corresponding to the shifting of the chain from the larger sprocket to the smaller sprocket, if its inner link plate pair is axially next to the trailing first tooth of the larger sprocket, is in contact with the outside of its inner link plate farther from the smaller sprocket against the bevel of the trailing first tooth of the first tooth pair of the larger sprocket, while if an outer link plate pair of the chain transfer segment is axially next to the trailing first tooth of the first tooth pair of the larger sprocket, this first tooth is engaged between the outer link plates of this outer link plate pair and then an inner link plate of an inner link plate pair following the above-mentioned outer link plate pair is in contact against the bevel of the tooth of the larger sprocket following the first tooth of the first tooth pair of the larger sprocket;

that first tooth and the second tooth of the teeth preceding the enlarged tooth space of the larger sprocket are inclined, axially offset or bevelled radially outward to coordinate with the inclined position of the chain which already starts there in relation to its plane of circulation;

the larger sprocket and the smaller sprocket are part of a larger group of sprocket wheels of the multisprocket unit, in which case either the sprocket heretofore regarded as the larger sprocket becomes the smaller sprocket in relation to an even larger sprocket adjacent to it, and/or the sprocket heretofore regarded as the smaller sprocket becomes the larger sprocket in relation to an even smaller sprocket, and whereby the features recited heretofore with relation to the pair of sprockets constituted by the aforementioned larger sprocket and the aforementioned smaller sprocket, are present for at least one neighboring pair of sprockets other than the pair of sprockets constituted by the aforementioned larger sprocket and aforementioned smaller sprocket;

corresponding to a sprocket pair of a multisprocket unit, there are a number of chain transfer circumferential areas distributed over the circumference, in which the characteristics relating to chain transfer areas recited heretofore apply to each of said number of chain transfer circumferential areas; and the midpoints of the tooth spaces of the sprocket form an irregular polygon, whereby the link axes lying on a joint connecting line form larger polygon sides G–G–G.

14. Sprocket arrangement for a manually powered vehicle, such a vehicle having at least one wheel, at least one wheel hub mounted on the at least one wheel, and a chain for providing a torsional force to be transferred to said at least one wheel hub, said sprocket arrangement comprising:

a first sprocket;

said first sprocket having:
 means for connecting with a wheel hub of the manually powered vehicle;
 means for receiving a full torsional force from the chain and transferring the full torsional force to the hub; a second sprocket;

said second sprocket having:
 means for connecting with a wheel hub of the manually powered vehicle;
 means for receiving a full torsional force from the chain and transferring the full torsional force to the hub;

said first sprocket and said second sprocket having a common axis of rotation;

said first sprocket and said second sprocket each having a plane of rotation;

means for transferring the chain between said first sprocket and said second sprocket;

said chain transfer means comprising means for selectively imparting a displacement to the chain in either of a first direction and a second direction, the first direction being substantially opposite the first direction, the first and second directions being generally perpendicular to the plane of rotation of each of said first sprocket and said second sprocket;

said first sprocket comprising a plurality of teeth;

said second sprocket comprising a plurality of teeth;

a plurality of teeth of said first sprocket and said second sprocket comprising said means for receiving a full torsional force;

means for facilitating transfer of the chain between said first sprocket and said second sprocket;

said means for facilitating transfer comprising:
 means for locally substantially reducing on:
  at least one of said first sprocket and said second sprocket, and
  the chain,
  the transfer of the full torsional force between:
  at least one of said first sprocket and said second sprocket, and
  the chain;
 said means for locally substantially reducing the transfer of full torsional force being disposed between two teeth of said plurality of teeth for transferring full torsional force.

15. The sprocket arrangement according to claim 14, wherein at least some of the teeth of the larger sprocket, which are not identical to the leading first tooth of the first tooth pair of the larger sprocket, are bevelled radially outward on their side facing the smaller sprocket, and away from the smaller sprocket, namely in a radially outer area of their radial height.

16. The sprocket arrangement according to claim 15, wherein:

said means for facilitating transfer further comprises:
 recess means disposed in at least one of said first sprocket and said second sprocket, said recess means having means for accommodating and supporting a portion of the chain during transfer of the chain between said first sprocket and said second sprocket and for guiding the chain, during transfer, between said first sprocket and said second sprocket; and said recess has a surface having a portion extending substantially at a right angle with respect to the planes of rotation of said first sprocket and said second sprocket;

said recess means comprises means for defining the path of the corresponding chain transfer segment;

said recess means comprising a link support plate which, in the normal direction of rotation of said multisprocket unit, follows the trailing last tooth of the last tooth pair of the smaller sprocket;

said link support plate comprising means for accommodating and supporting a portion of the chain as the chain is being transferred between one of said first and second sprocket and the other;

said larger sprocket has a plurality of lateral surfaces, at least one of said lateral surfaces facing said smaller sprocket;

the link support plate comprises a relief-like recess, said the relief-like recess having a radially inner edge, the relief-like recess being recessed into one of said at least one lateral surface of the larger sprocket facing the smaller sprocket; and the link support plate is formed by the radially inner edge of the relief-like recess.

17. The sprocket arrangement according to claim 16, wherein:

at least one tooth is omitted between two successive teeth of one of said first and second sprockets to thereby form a multiple-tooth space in the form of a double-tooth space; and at the position of the omitted tooth of the double tooth space, at least on the larger sprocket, there is a spur, which if it is axially next to an inner link plate pair lies outside the space between this inner link plate pair, namely on the outside of the inner link plate which is farther from the smaller sprocket, and which if it is axially next to an outside link plate pair projects into the space between the link plates of this outer link plate pair.

18. The sprocket arrangement according to claim 17, wherein:

the tooth space contour of the tooth space of the multiple tooth space and the tooth space contour of a tooth space immediately following this multiple tooth space are coordinated with one another so that when a corresponding number of chain links are present in these tooth spaces, their link axes lie on a common straight connecting line, whereby the leading chain link in the multiple tooth space and the chain link located in the following tooth space are in at least proportional torque-transmitting contact during the runout into the tension strand jointly on the trailing edge of the tooth or preceding them, and during the winding of the tension strand of the chain onto the chainwheel of a driving sprocket set, are jointly in contact to transmit torque to the trailing flank of the tooth preceding them;

said first sprocket and said second sprocket comprise a portion of a multisprocket unit, said multisprocket unit being one of:
 a driving sprocket unit for driving the chain of the manually powered vehicle; and
 a driven sprocket unit for being driven by the chain of the manually powered vehicle;

the manually powered vehicle having two wheels;

the chain is for connecting the driving sprocket unit and the driven sprocket unit with one another;

the chain comprises a plurality of chain links, each of the chain links comprising a pair of link plates disposed in parallel with respect to one another;

the plurality of chain links comprise:
- first pairs of link plates being outer pairs of link plates;
- second pairs of link plates being inner pairs of link plates;
- each link plate of each first pair of link plates being connected to a corresponding link plate of each neighboring second pair of link plates;
- each link plate of each second pair of link plates being disposed between, and flanked by, the link plates of each neighboring first pair of link plates;
- the first and second pairs of link plates alternating with each other along the chain;

said chain transfer means comprises:
- means for shifting the chain between said first and second sprocket;
- said shifting means being disposed in an approach area, in which the chain approaches said multisprocket unit;

the chain transfer segment is for being disposed in a region, with respect to said first and second sprocket, between the approach area and a chain runout area, the chain runout area being that area in which the chain leaves said first sprocket and said second sprocket;

the chain transfer segment is for extending opposite to the normal direction of circulation of said multisprocket unit from a chain link which is the last chain link engaged between two last teeth of a final pair of teeth of the one of said first and second sprocket from which the chain is being shifted to a chain link which is the first link engaged between two first teeth of a first pair of teeth of the one of said first and second sprocket to which the the chain is being shifted;

the relief-like recess has a leading edge which runs essentially radially and which, in the normal direction of circulation, precedes the axis of the multisprocket unit, whereby a link plate which is adjacent in the axial direction to this leading edge runs past this leading edge;

the relief-like recess in a leading area corresponding to the normal direction of circulation in front of a leading end of the link support plate is extended radially inward toward the axis of the multisprocket unit;

the leading first tooth of the first tooth pair of the larger sprocket is bevelled radially outward on its lateral surface away from the smaller sprocket and toward the smaller sprocket;

to facilitate the shifting of the chain from the larger sprocket to the smaller sprocket, additional design measures are provided in the chain transfer circumference area for the transfer of the chain from the smaller sprocket to the larger sprocket on teeth of the larger sprocket;

the trailing first tooth of the first tooth pair of the larger sprocket and/or the first tooth following this trailing first tooth following the latter in the normal direction of circulation of the large sprocket has bevels on the side facing the smaller sprocket, namely so that the bevelled surfaces, when viewed from radially outward in the axial direction, run forward and away from the smaller sprocket in the normal direction of circulation;

both the trailing first tooth of the larger sprocket and also the tooth following it in the normal direction of circulation have bevels, whereby a chain transfer segment corresponding to the shifting of the chain from the larger sprocket to the smaller sprocket, if its inner link plate pair is axially next to the trailing first tooth of the larger sprocket, is in contact with the outside of its inner link plate farther from the smaller sprocket against the bevel of the trailing first tooth of the first tooth pair of the larger sprocket, while if an outer link plate pair of the chain transfer segment is axially next to the trailing first tooth of the first tooth pair of the larger sprocket, this first tooth is engaged between the outer link plates of this outer link plate pair and then an inner link plate of an inner link plate pair following the above-mentioned outer link plate pair is in contact against the bevel of the tooth of the larger sprocket following the first tooth of the first tooth pair of the larger sprocket;

that first tooth and the second tooth of the teeth preceding the enlarged tooth space of the larger sprocket are inclined, axially offset or bevelled radially outward to coordinate with the inclined position of the chain which already starts there in relation to its plane of circulation;

the larger sprocket and the smaller sprocket are part of a larger group of sprocket wheels of the multisprocket unit, in which case either the sprocket heretofore regarded as the larger sprocket becomes the smaller sprocket in relation to an even larger sprocket adjacent to it, and/or the sprocket heretofore regarded as the smaller sprocket becomes the larger sprocket in relation to an even smaller sprocket, and whereby the features recited heretofore with relation to the pair of sprockets constituted by the aforementioned larger sprocket and the aforementioned smaller sprocket, are present for at least one neighboring pair of sprockets other than the pair of sprockets constituted by the aforementioned larger sprocket and aforementioned smaller sprocket;

there is a spur only in the vicinity of the double tooth space of the largest sprocket or of the largest sprockets of a multisprocket unit;

corresponding to a sprocket pair of a multisprocket unit, there are a number of chain transfer circumferential areas distributed over the circumference, in which the characteristics relating to chain transfer areas recited heretofore apply to each of said number of chain transfer circumferential areas; and the midpoints of the tooth spaces of the sprocket form an irregular polygon, whereby the link axes lying on a joint connecting line form larger polygon sides G–G–G.

\* \* \* \* \*